(12) United States Patent
Vakili

(10) Patent No.: US 11,057,197 B1
(45) Date of Patent: Jul. 6, 2021

(54) SYSTEMS AND METHODS FOR CENTRALIZED QUANTUM SESSION AUTHENTICATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 354 days.

(21) Appl. No.: 16/105,020

(22) Filed: Aug. 20, 2018

(51) Int. Cl.
*H04L 9/08* (2006.01)
*H04L 29/06* (2006.01)

(52) U.S. Cl.
CPC .......... *H04L 9/0844* (2013.01); *H04L 9/0858* (2013.01); *H04L 9/0869* (2013.01); *H04L 63/08* (2013.01)

(58) Field of Classification Search
CPC ... H04L 9/0844; H04L 9/0869; H04L 9/0858; H04L 63/08
See application file for complete search history.

(56) References Cited

U.S. PATENT DOCUMENTS

| | | | |
|---|---|---|---|
| 5,515,438 A | 5/1996 | Bennett et al. | |
| 6,289,104 B1 | 9/2001 | Patterson et al. | |
| 7,324,647 B1 | 1/2008 | Elliott | |
| 7,333,611 B1 | 2/2008 | Yuen et al. | |
| 7,457,416 B1 * | 11/2008 | Elliott | H04L 9/0852 380/256 |
| 7,460,669 B2 | 12/2008 | Foden et al. | |
| 7,649,996 B2 | 1/2010 | Nishioka et al. | |
| 7,697,693 B1 | 4/2010 | Elliott | |
| 7,787,628 B2 | 8/2010 | Kuang et al. | |
| 8,332,730 B2 | 12/2012 | Harrison et al. | |

(Continued)

FOREIGN PATENT DOCUMENTS

| | | |
|---|---|---|
| CN | 107040378 A | 8/2017 |
| WO | 2017/108539 A1 | 6/2017 |

OTHER PUBLICATIONS

Charjan, S. et al., "Quantum Key Distribution by Exploitation Public Key Cryptography (ECC) in Resource Constrained Devices," International Journal of Emerging Engineering Research and Technology, 3(7): 5-12, (2015).

(Continued)

*Primary Examiner* — Samson B Lemma
*Assistant Examiner* — Abdullah Almamun
(74) *Attorney, Agent, or Firm* — Alston & Bird LLP

(57) ABSTRACT

Systems, apparatuses, methods, and computer program products are disclosed for session authentication. An example method includes determining a first set of quantum bases, generating a first control signal indicative of the first set of quantum bases, and transmitting the first control signal over a communications network to a qubit encoder. The example method further includes determining a second set of quantum bases, generating a second control signal indicative of the second set of quantum bases, and transmitting the second control signal over the communications network to a qubit decoder. The example method further includes generating a third control signal indicative of an instruction to encode a set of bits and transmitting the third control signal over the communications network to the qubit encoder.

20 Claims, 16 Drawing Sheets

(56) References Cited

U.S. PATENT DOCUMENTS

| | | | |
|---|---|---|---|
| 8,683,192 | B2 | 3/2014 | Ayling et al. |
| 8,693,691 | B2 | 4/2014 | Jacobs |
| 8,755,525 | B2 | 6/2014 | Wiseman |
| 8,855,316 | B2 | 10/2014 | Wiseman et al. |
| 9,036,817 | B1 | 5/2015 | Hunt et al. |
| 9,083,684 | B2 | 7/2015 | Tanizawa et al. |
| 9,184,912 | B2 | 11/2015 | Harrington |
| 9,191,198 | B2 | 11/2015 | Harrison et al. |
| 9,680,640 | B2 | 6/2017 | Hughes et al. |
| 9,692,595 | B2 | 6/2017 | Lowans et al. |
| 10,439,806 | B2 | 10/2019 | Fu et al. |
| 10,540,146 | B1 | 1/2020 | Vakili |
| 10,587,402 | B2 | 3/2020 | Nordholt et al. |
| 2002/0106084 | A1* | 8/2002 | Azuma ............... B82Y 10/00 380/263 |
| 2003/0002674 | A1* | 1/2003 | Nambu ............... H04L 9/0852 380/256 |
| 2004/0109564 | A1 | 6/2004 | Cerf et al. |
| 2004/0238813 | A1 | 12/2004 | Lidar et al. |
| 2005/0036624 | A1 | 2/2005 | Kent et al. |
| 2005/0157875 | A1 | 7/2005 | Nishioka et al. |
| 2005/0249352 | A1 | 11/2005 | Choi et al. |
| 2006/0056630 | A1 | 3/2006 | Zimmer et al. |
| 2006/0263096 | A1 | 11/2006 | Dinu et al. |
| 2007/0110242 | A1 | 5/2007 | Tomita et al. |
| 2007/0260658 | A1 | 11/2007 | Fiorentino et al. |
| 2008/0076525 | A1 | 3/2008 | Kim |
| 2009/0169015 | A1* | 7/2009 | Watanabe ........... H04L 9/0858 380/278 |
| 2009/0180615 | A1 | 7/2009 | Trifonov |
| 2011/0126011 | A1 | 5/2011 | Choi et al. |
| 2011/0142242 | A1* | 6/2011 | Tanaka ............... H04L 9/0858 380/282 |
| 2011/0173696 | A1 | 7/2011 | Dynes et al. |
| 2011/0213979 | A1 | 9/2011 | Wiseman et al. |
| 2011/0280405 | A1 | 11/2011 | Habif |
| 2013/0083926 | A1 | 4/2013 | Hughes et al. |
| 2013/0101119 | A1 | 4/2013 | Nordholt et al. |
| 2013/0101121 | A1 | 4/2013 | Nordholt et al. |
| 2013/0163759 | A1 | 6/2013 | Harrison et al. |
| 2013/0251145 | A1* | 9/2013 | Lowans ............... H04L 9/0858 380/44 |
| 2013/0315395 | A1 | 11/2013 | Jacobs |
| 2015/0188701 | A1 | 7/2015 | Nordholt et al. |
| 2015/0222619 | A1 | 8/2015 | Hughes et al. |
| 2015/0312035 | A1 | 10/2015 | Choi |
| 2016/0028542 | A1 | 1/2016 | Choi et al. |
| 2016/0191173 | A1 | 6/2016 | Malaney |
| 2016/0248586 | A1 | 8/2016 | Hughes et al. |
| 2016/0328211 | A1 | 11/2016 | Nordholt et al. |
| 2016/0352515 | A1 | 12/2016 | Bunandar et al. |
| 2017/0126654 | A1 | 5/2017 | Fu |
| 2017/0214525 | A1 | 7/2017 | Zhao et al. |
| 2017/0222731 | A1 | 8/2017 | Lucamarini et al. |
| 2017/0324551 | A1 | 11/2017 | Ahn |
| 2017/0324552 | A1 | 11/2017 | Ahn |
| 2017/0331623 | A1* | 11/2017 | Fu ........................ G06F 21/602 |
| 2017/0338951 | A1 | 11/2017 | Fu et al. |
| 2017/0338952 | A1 | 11/2017 | Hong et al. |
| 2018/0069698 | A1 | 3/2018 | Hong et al. |
| 2018/0198608 | A1 | 7/2018 | Nordholt et al. |
| 2018/0269989 | A1 | 9/2018 | Murakami et al. |
| 2019/0007215 | A1 | 1/2019 | Hakuta et al. |
| 2019/0020469 | A1 | 1/2019 | Dottax et al. |
| 2019/0129694 | A1 | 5/2019 | Benton et al. |
| 2019/0149327 | A1* | 5/2019 | Yuan ................... H04L 9/0855 380/255 |
| 2019/0190706 | A1 | 6/2019 | Stack et al. |
| 2019/0238326 | A1 | 8/2019 | Ji et al. |
| 2019/0243611 | A1 | 8/2019 | Martin et al. |
| 2019/0268146 | A1 | 8/2019 | Samid |
| 2019/0289006 | A1 | 9/2019 | Fang et al. |
| 2020/0153619 | A1 | 5/2020 | Ribordy |

OTHER PUBLICATIONS

Non-Final Rejection for U.S. Appl. No. 15/916,763, dated Oct. 30, 2019.

Non-Final Rejection for U.S. Appl. No. 16/105,294, dated Nov. 12, 2019.

Non-Final Rejection for U.S. Appl. No. 16/105,370, dated Nov. 8, 2019.

Pandya, M., "Securing Clouds-The Quantum Way," arXiv preprint arXiv:1512.02196, 16 pages, (2015).

Armanuzzaman, Md. et al. A Secure and Efficient Data Transmission Technique Using Quantum Key Distribution. 2017 4th International Conference on Networking, Systems and Security (NSysS). https://ieeexplore.ieee.org/stamp/stamp.jsp?tp=&arnumber=8267797 (Year: 2017).

Liu, Zhihao et al. Mutually Authenticated Quantum Key Distribution Based on Entanglement Swapping. 2009 Pacific-Asia Conference on Circuits, Communications and Systems. https://ieeexplore.ieee.org/stamp/stamp.jsp?tp=&arnumber=5232366 (Year:2009).

Ronczka, John. Backchanneling Quantum Bit (Qubit) 'Shuffling1: Quantum Bit (Qubit) Shuffling' as Added Security by Slipstreaming Q-Morse. 2016 3rd Asia-Pacific World Congress on Computer Science and Engineering (APWC on CSE). https://ieeexplore.ieee.org/stamp/stamp.jsp?tp=&arnumber=7941948 (Year: 2016).

Sirdhar, S. et al., Intelligent Security Framework for IoT Devices Cryptography based End-To-End security Architecture, International Conference on Inventive Systems and Control (ICISC-2017) 1-5.

Mohammad, Omer K. et al., Statistical Analysis for Random Bits Generation on Quantum Key Distribution, Cyber Warfare and Digital Forensic (CyberSec), 2014 Third International Conference (2014) 45-51.

Liu, D. et al., A Communication Model in Multilevel Security Network Using Quantum Key, Chinese Automation Congress (CAC) (2015) 915-918.

Hong, K. W. et al., Challenges in Quantum Key Distribution: A Review, ACM Proceeding (2016) 29-33.

Debuisschert, T. et al., Strenghtening Classical Symmetric Encryption with Continuous Variable Quantum Key Distribution, CLEO Technical Digest, OSA (2012), 2 pages.

Abubakar, M. Y. et al., Two Channel Quantum Security Modelling Focusing on Quantum Key Distribution Technique, IT Convergence and Security (ICITCS), 2015 5th International Conference (2015) 5 pages.

Bienfang, J.C. et al. Quantum generated one-time-pad encryption with 1.25 Gbps clock synchronization. 2005 OFC/NFOEC Technical Digest. Optical Fiber Communication Conference. https://eeexplore.ieee.org/stamp/stamp.jsp?tp=&arnumber=1501276 (Year: 2005).

Chen, Wei et al. Field Experiment on a "Star Type" Metropolitan Quantum Key Distribution Network. IEEE Photonics Technology Letters, vol. 21, Issue: 9. https://ieeexplore.ieee.org/stamp/stamp.isp?tp=&arnumber=4787043 (Year: 2009).

Elboukhari, Mohamed et al. Implementation of secure key distribution based on quantum cryptography. 2009 International Conference on Multimedia Computing and Systems. https://ieeexplore.ieee.org/stamp/stamp.jsp?tp=&arnumber=5256673 (Year:2009).

Thangavel, T. S.; Krishnan, A. Performance of integrated quantum and classical cryptographic model for password authentication. https://ieeexplore.ieee.org/stamp/stamp.jsp?tp=&arnumber=5591718 (Year: 2010).

Non-Final Office Action dated Jan. 16, 2020 for U.S. Appl. No. 16/712,338.

Garcia-Escartin, Juan Carlos; Chamorro-Posada, Pedro. Hidden Probe Attacks on Ultralong Fiber Laser Key Distribution Systems. IEEE Journal of Selected Topics in Quantum Electronics (vol. 24 , Issue: 3 , May-Jun. 2018). https://ieeexplore.ieee.org/stamp/stamp.jsp?tp=&arnumber=8219358 (Year: 2018).

Imany, Poolad et al. Demonstration of frequency-bin entanglement in an integrated optical microresonator. 2017 Conference on Lasers and Electro-Optics (CLEO). https://ieeexplore.ieee.org/stamp/stamp.jsp?tp=&arnumber=8083593 (Year: 2017).

(56) References Cited

OTHER PUBLICATIONS

Price, Alasdair B. et al. High-Speed Quantum Key Distribution with Wavelength-Division Multiplexing on Integrated Photonic Devices. 2018 Conference on Lasers and Electro-Optics (CLEO). https://ieeexplore.ieee.org/stamp/stamp.jsp?tp=&arnumber=8426886 (Year: 2018).

* cited by examiner

| QUBIT ENCODER | SET OF BITS | 1 | 1 | 0 | 0 | 0 | 1 | 1 | 0 |
|---|---|---|---|---|---|---|---|---|---|
| | QUANTUM BASIS USED TO ENCODE SET OF BITS | FIRST | FIRST | FIRST | FIRST | FIRST | FIRST | FIRST | FIRST |
| QUBIT DECODER | QUANTUM BASIS USED TO DECODE SET OF QUBITS | FIRST | SECOND | FIRST | SECOND | FIRST | SECOND | FIRST | SECOND |
| | DECODED SET OF BITS | 1 | 0 | 0 | 0 | 0 | 0 | 1 | 0 |
| | CORRECTNESS | CORRECT | ERROR | CORRECT | CORRECT | CORRECT | ERROR | CORRECT | CORRECT |

FIG. 3

| | | | | | | | | | |
|---|---|---|---|---|---|---|---|---|---|
| QUBIT ENCODER | SET OF BITS | 1 | 1 | 0 | 0 | 0 | 1 | 1 | 0 |
| | QUANTUM BASIS USED TO ENCODE FIRST SUBSET OF BITS | FIRST | FIRST | FIRST | FIRST | | | | |
| | QUANTUM BASIS USED TO ENCODE SECOND SUBSET OF BITS | | | | | FIRST | FIRST | FIRST | FIRST |
| FIRST QUBIT DECODER | QUANTUM BASIS USED TO DECODE FIRST SUBSET OF QUBITS | FIRST | SECOND | FIRST | SECOND | | | | |
| | FIRST SET OF DECODED BITS | 1 | 0 | 0 | 0 | | | | |
| | CORRECTNESS | CORRECT | ERROR | CORRECT | CORRECT | | | | |
| SECOND QUBIT DECODER | QUANTUM BASIS USED TO DECODE SECOND SUBSET OF QUBITS | | | | | FIRST | THIRD | FIRST | THIRD |
| | SECOND SET OF DECODED BITS | | | | | 0 | 0 | 1 | 0 |
| | CORRECTNESS | | | | | CORRECT | ERROR | CORRECT | CORRECT |

SYSTEMS AND METHODS FOR CENTRALIZED QUANTUM SESSION AUTHENTICATION

TECHNOLOGICAL FIELD

Example embodiments of the present disclosure relate generally to session authentication and, more particularly, to systems and methods for quantum session authentication.

BACKGROUND

Session authentication may describe various techniques for securing electronic communications between two computing devices, such as a server device and a client device, using a unique session key (e.g., a session identifier (ID)). Selecting a session key that cannot be guessed is thus an important element of preventing attacks whereby a perpetrator derives the session key and then uses it to intercept communications by tapping into the communication path between the server device and the client device. This security concern is amplified in high volume session authentication systems designed to authenticate multiple sessions between multiple computing devices, such as multiple server devices and multiple client devices, at any given time.

Generating session IDs to be used in session authentication often relies upon the use of pseudo-random number generation. While often referred to as "random number generation," in truth it has historically been difficult to generate truly random numbers, and tools for "random" number generation have usually employed procedures whose outputs can be reproduced if certain underlying inputs are known. And while historically such pseudo-random number generation has been sufficient to generate session IDs that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, because perpetrators have a greater ability to determine the method by which a session key is pseudo-randomly generated, replicate the method to generate the same session key, and then break into a user's session.

BRIEF SUMMARY

Systems, apparatuses, methods, and computer program products are disclosed herein for improved session authentication. The session authentication system provided herein solves the above problems by encoding and decoding quantum bits (qubits) using different sets of quantum bases in order to inject true randomness into the process for generating session keys or seeds for a pseudorandom number generation process used to establish secure sessions at multiple session authentication system server devices.

In one example embodiment, a system is provided for session authentication. The system may comprise a central management device comprising quantum basis determination circuitry configured to determine a first set of quantum bases. The quantum basis determination circuitry may be further configured to determine a second set of quantum bases. The quantum basis determination circuitry may be further configured to generate a first control signal indicative of the first set of quantum bases. The quantum basis determination circuitry may be further configured to generate a second control signal indicative of the second set of quantum bases. The quantum basis determination circuitry may be further configured to generate a third control signal indicative of an instruction to encode a set of bits. The central management device may further comprise classical communications circuitry configured to transmit the first control signal over a communications network to a qubit encoder. The classical communications circuitry of the central management device may be further configured to transmit the second control signal over the communications network to a qubit decoder. The classical communications circuitry of the central management device may be further configured to transmit the third control signal over the communications network to the qubit encoder.

In some embodiments, the system may further comprise a qubit encoder. The qubit encoder may comprise classical communications circuitry configured to receive the first control signal and the third control signal over the communications network. The qubit encoder may further comprise encoding circuitry configured to encode, in response to receipt of the third control signal, the set of bits based on the first set of quantum bases to generate a set of qubits. The qubit encoder may further comprise quantum communications circuitry configured to transmit the set of qubits over a quantum line.

In some embodiments, the system may further comprise a qubit decoder. The qubit decoder may comprise quantum communications circuitry configured to receive the set of qubits over the quantum line. The qubit decoder may further comprise classical communications circuitry configured to receive the second control signal over the communications network. The qubit decoder may further comprise decoding circuitry configured to decode the set of qubits based on the second set of quantum bases to generate a decoded set of bits. In some embodiments, the communications circuitry of the qubit decoder may be further configured to transmit the decoded set of bits over the communications network to a session authentication system server device.

In some embodiments, the system may further comprise a session authentication system server device comprising classical communications circuitry configured to receive the decoded set of bits over the communications network. The session authentication system server device may further comprise session authentication circuitry configured to generate a session key based on the decoded set of bits. In some embodiments, the classical communications circuitry of the session authentication system server device may be further configured to transmit the session key to a client device for use in session authentication by causing quantum key distribution circuitry to perform a quantum key distribution process that transmits the generated session key to the client device. In some embodiments, the session authentication system server device may further comprise random number generation circuitry in communication with the session authentication circuitry and configured to generate a number based on the decoded set of bits. In some embodiments, the session authentication circuitry of the session authentication system server device may be further configured to generate the session key by (i) setting the session key equal to the generated number, or (ii) using the generated number as a seed in a pseudo-random number generation procedure, wherein an output of the pseudo-random number generation procedure comprises the session key.

In another example embodiment, a method is provided for session authentication. The method may comprise determining, by quantum basis determination circuitry, a first set of quantum bases. The method may further comprise determining, by the quantum basis determination circuitry, a second set of quantum bases. The method may further comprise generating, by the quantum basis determination circuitry, a first control signal indicative of the first set of quantum bases. The method may further comprise generating, by the quantum basis determination circuitry, a second control signal indicative of the second set of quantum bases. The method may further comprise generating, by the quantum basis determination circuitry, a third control signal indicative of an instruction to encode a set of bits. The method may further comprise transmitting, by classical communications circuitry, the first control signal over a communications network to a qubit encoder. The method may further comprise transmitting, by the classical communications circuitry, the second control signal to over the communications network a qubit decoder. The method may further comprise transmitting, by the classical communications circuitry, the third control signal over the communications network to the qubit encoder.

In another example embodiment, a computer program product is provided for session authentication. The computer program product includes at least one non-transitory computer-readable storage medium storing program instructions that, when executed, may cause a central management device to determine a first set of quantum bases. The program instructions, when executed, may further cause the central management device to determine a second set of quantum bases. The program instructions, when executed, may further cause the central management device to generate a first control signal indicative of the first set of quantum bases. The program instructions, when executed, may further cause the central management device to generate a second control signal indicative of the second set of quantum bases. The program instructions, when executed, may further cause the central management device to transmit the first control signal over a communications network to a qubit encoder. The program instructions, when executed, may further cause the central management device to transmit the second control signal over the communications network to a qubit decoder. The program instructions, when executed, may further cause the central management device to transmit the third control signal over the communications network to the qubit encoder.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

FIG. 3 illustrates example sets of bits and quantum bases in accordance with some example embodiments described herein;

FIG. 4 illustrates example sets of bits and quantum bases in accordance with some example embodiments described herein;

DETAILED DESCRIPTION

Figure 1A:
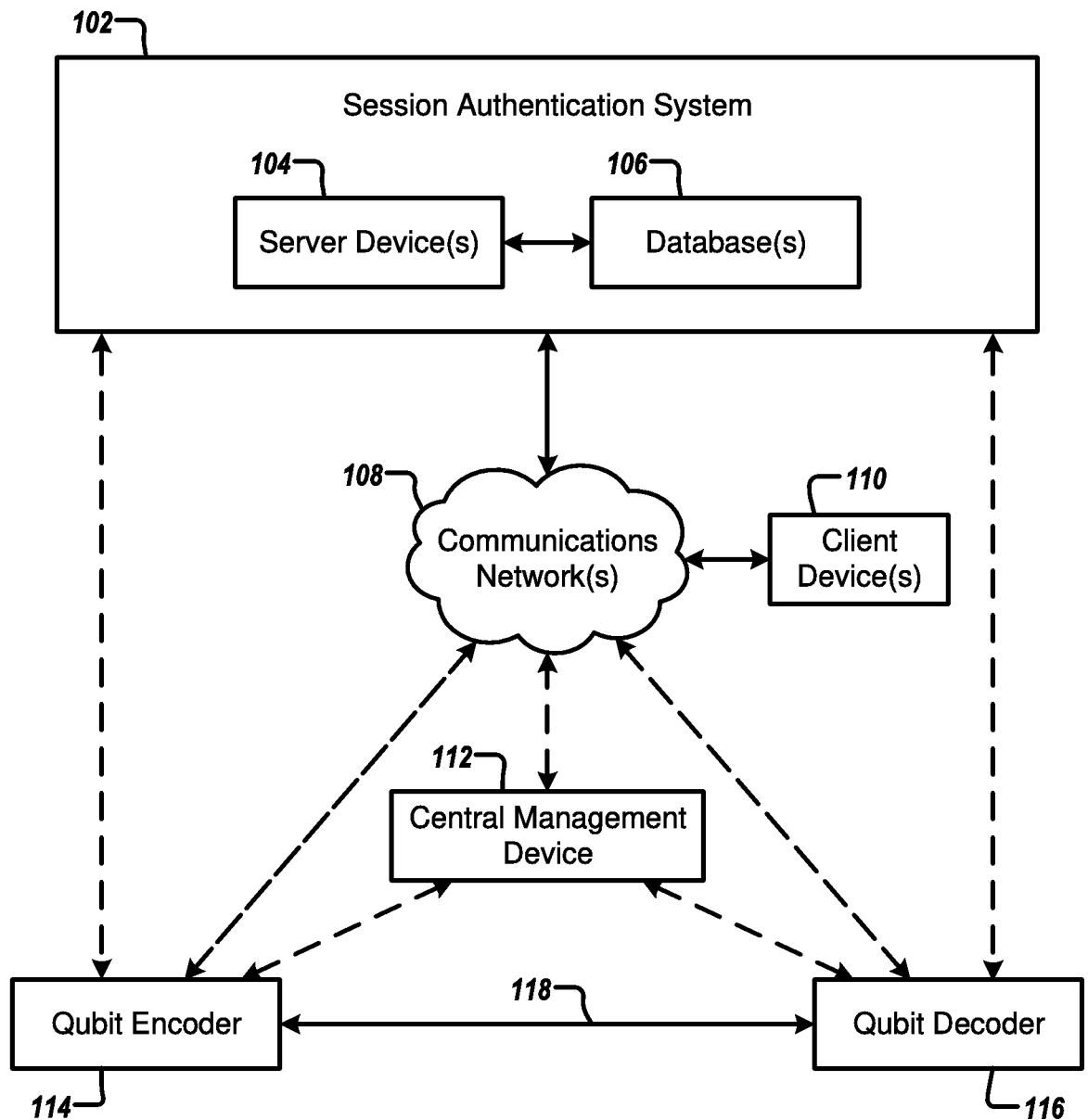
FIGS. 1A, 1B, 1C, and 1D illustrate system diagrams of sets of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for session authentication. Traditionally, it has been very difficult to select or generate a robust session key or ID (e.g., a unique number that is unlikely to be guessed or deciphered by a third party). In addition, there is typically no way to prove that the session ID is unattainable by a third party perpetrator. In an attempt to transmit session IDs that are unattainable by a perpetrator, quantum key distribution (QKD) systems have been developed. In general terms, QKD systems exchange keys between two parties in a secure way that cannot be guessed. For instance, a one-time-pad quantum key exchange is impenetrable because a potential perpetrator eavesdropping on the transmission of a set of qubits representing a key will necessarily induce errors in the set of qubits due to quantum uncertainty, alerting the two parties to the attempted eavesdropping.

In contrast to these conventional QKD systems for transmitting secret keys securely, the present disclosure relates to a mechanism for generating unique keys in the first place. To do this, a session authentication system encodes and decodes a set of quantum bits (e.g., qubits) using different quantum bases in order to generate a random number used to generate a session key or a random seed (e.g., a set of bits that is randomized due to quantum effects such as the principle of quantum uncertainty) for pseudorandom number generation used to establish a secure session. When a bit is encoded into a qubit using a first quantum basis and decoded using the first quantum basis, the original bit is recreated. However, the nature of quantum uncertainty and the indeterminacy of quantum states establishes that decoding the qubit using a second quantum basis different from the first quantum basis will generate a bit that has some probability of being different than the original bit. As such, by ensuring that different quantum bases are used when encoding and decoding at least some of the set of qubits in a transmission, the session authentication system disclosed herein introduces random errors in the decoded bits based on quantum uncertainty and the indeterminacy of quantum states. These random errors can then prevent the reproduction of session keys by malicious attackers.

The present disclosure thus provides improved centralized session authentication techniques by encoding and decoding quantum bits (qubits) using different sets of quantum bases in order to randomly generate a number that may be used to generate a session key or that may comprise a random seed for pseudorandom number generation used to establish a secure session. In one illustrative example, the present disclosure provides for encoding, by a qubit encoder (e.g., a first optoelectronic device such as a polarized light modulator (PLM); a laser device), a sequence of bits using varied quantum bases to generate a sequence of qubits. Each qubit may comprise any linear combination of two states in contrast with classical bit which could only include 1 or 0. The quantum bases may comprise, for instance, the horizontal photon polarization state |0> and the vertical photon polarization state |1>. The quantum bases may alternatively or in addition comprise the left circular photon polarization state |L> and the right circular photon polarization state |R>, which are linear combinations of the vertical and horizontal photon polarization states |0> and |1>. Subsequently, the present disclosure provides for transmitting the sequence of qubits from the qubit encoder to a qubit decoder (e.g., a second optoelectronic device such as a polarized light demodulator (PLD)). In some instances, the present disclosure provides for generating, by the qubit decoder, a sequence of random bits by decoding (e.g., measuring) the received sequence of qubits using arbitrary quantum bases that will thus not match the quantum bases used to encode the sequence of qubits, and which will thus introduce random errors in the decoded set of bits based on quantum uncertainty. The present disclosure then provides for a centralized server device referred to herein as a central management device that generates sequence of random bits and uses those bits as a random number used to generate a session key or as a seed for pseudorandom number generation in session authentication.

In some embodiments, the present disclosure provides for generating a number of bits at a first device (e.g., a server device), encoding the number of bits as quantum bits using a randomly-determined set of quantum bases, transmitting the quantum bits to a second device (e.g., a client device), decoding (e.g., measuring) the quantum bits at the second device using an arbitrarily-determined quantum basis, and using the decoded bits as a seed for pseudo-random number generation in session authentication. The first device and the second device may include a respective qubit encoder and qubit decoder, such that the first and second devices can together perform the encoding and decoding functions contemplated herein. In other embodiments, the first device is connected to a separate qubit encoder while the second device is connected to a separate qubit decoder, such that the first and second devices do not perform the quantum encoding or decoding directly, but are in communication with the devices that do perform these functions. In yet other implementations, the first device includes the qubit encoder while the second device relies upon a separate qubit decoder, or the first device relies upon a separate qubit encoder while the second device comprises a qubit decoder. In any event, it will be understood that while the quantum encoding and decoding functions may be performed by the first and second devices or by separate devices connected thereto, the second device is nevertheless configured to subsequently use the decoded set of bits for session ID creation (or for any other purpose).

In some embodiments, the present disclosure provides for generating a number of bits at a first device (e.g., an encoding device), encoding the number of bits as quantum bits using a randomly-determined set of quantum bases, transmitting the quantum bits to a switching device, transmitting subsets of the quantum bits to multiple recipient devices (e.g., a first qubit decoder associated with a first session server and a second qubit decoder associated with a second session server) decoding (e.g., measuring) the received quantum bits at the multiple recipient devices using arbitrarily-determined sets of quantum bases, and using the decoded bits in session authentication. The first device may include a qubit encoder and each recipient device may include a respective qubit decoder, such that the first device and the recipient devices can together perform the encoding and decoding functions contemplated herein. In other embodiments, the first device is connected to a separate qubit encoder while the recipient devices are connected to separate qubit decoders, such that the first device and the recipient devices do not perform the quantum encoding or decoding directly, but are in communication with the devices that do perform these functions. In yet other implementations, the first device includes the qubit encoder while the recipient devices rely upon separate qubit decoders, or the first device relies upon a separate qubit encoder while the recipient devices comprise qubit decoders. In any arrangement, it will be understood that while the quantum encoding and decoding functions may be performed by the first device and the recipient devices or by separate devices connected thereto, the recipient devices are nevertheless configured to subsequently use the decoded sets of bits for session authentication (or for any other purpose).

In some embodiments, the session authentication system generates a random number by transmitting a sequence of bits, with each bit being encoded as a quantum state. For instance, the |0> and |1> states may correspond to horizontal and vertical photon polarization states, while the |L> and |R> states may correspond to the two circular photon polarization states. Thus, each state is an indication of a bit and referred to herein as a "qubit." In some embodiments, the session authentication system generates a session ID that is truly random based on the random number generated by the session authentication system. In some embodiments, the session authentication system uses this random number to generate a seed for pseudo-random number generation (PRNG) that is completely unknown. In some embodiments, the session authentication system generates a number (n) of qubits in different quantum bases. For instance, two different quantum bases could be the horizontal and vertical polarization states and the two circular photon polarization states, which are linear combinations of the vertical and horizontal photon polarization states. In some embodiments, the session authentication system then transmits the generated qubits from the qubit encoder to the qubit decoder over a quantum line. The qubit encoder and the qubit decoder may, as noted above, be in communication or integrated with any two computing devices involved in session ID generation, such as a central management device and a session authentication system, as shown in FIGS. 1A-1D. In some embodiments, a cloud-based centralized qubit encoder may encode a number of qubits using a set of quantum bases and transmit the qubits over a quantum line to a number of servers or server farms. Each server may use their own quantum bases to decode the qubits.

In some embodiments, the qubit decoder does not know the quantum basis in which these qubits were encoded (e.g., the qubit encoder does not know if these qubits were encoded using the |0>, |1> states or the |L>, |R> states, or any other quantum states). The qubit decoder uses its own set of quantum bases to measure these states. In some instances, the quantum bases used by the qubit decoder are sets of quantum bases arbitrarily determined independent of the quantum bases used to encode the qubits. According to the quantum uncertainty of the states, each time the qubit decoder uses a different quantum basis from the qubit encoder, it has a probability (e.g., a fifty percent chance) of measuring the bit that was originally encoded. As a result, presuming that at least a portion of the bit pattern generated by the qubit decoder is decoded using a different quantum basis than used during encoding, then upon decoding (e.g., measuring) the bit pattern, the resulting set of bits is inherently random and may be used as a random number for any purpose, e.g., as a session ID or a seed for PRNG. The random number cannot be reproduced by any perpetrator due to the probabilistic effects of quantum uncertainty, even if the perpetrator knows the original bits that were transmitted.

In some embodiments, the present disclosure provides for a single qubit encoder that is used in session authentication in a server farm by generating impenetrable random binary numbers unique to each recipient device, and unique each time at a single recipient device. In some instances, the qubit encoder has no networking capability and generates qubits (e.g., polarized photons) according to a computer program stored and executed internally. The qubit encoder transmits the polarized photons over a polarization-maintaining optical fiber (PM fiber). The PM fiber feeds into a polarization maintaining optical switch (PM switch) out of which several PM fibers branch out onto different recipient devices. The PM switches are programmed and controlled to transmit qubits to any of the recipient devices. Once a recipient device receives the qubits, that recipient device does not know in what quantum basis those qubits were encoded because the quantum basis pattern used by the qubit encoder for encoding the qubits is programmed by the modulation electronics of the qubit encoder and is not known by any device or component external to itself. A recipient device is connected to the qubit encoder through one or more PM switches using PM fiber, and it includes a qubit decoder that measures the quantum bits in its own selected quantum basis (or set of quantum bases) which could be any given or random quantum basis or set of quantum bases. Due to inconsistency between the two sets of quantum bases at the qubit encoder and at the recipient device, the qubits measured by the recipient device are truly random. A session server then can use the binary number from measured quantum bits for session authentication. In some embodiments, the binary number may be used directly as a session ID or key. Alternatively, the session server may use the pattern as a seed in a pseudo-random number generator. Such a seed will be completely random and unknown to outsiders.

In some embodiments, the present disclosure provides for a laser device that is connected to many servers through a network of PM fibers and PM switches. Each server may comprise integrated optical receiver circuitry to receive and measure qubits. In one example implementation, an all optical PM switch may connect the laser device to sixteen servers. The connection may be modulated with fast modulation of the PM switch going to one server at a time. The laser device may also be connected through multiple PM switches via PM fiber to support a larger number of servers. For example, a laser device may be coupled to 256 servers through two layers of 1×16 PM switches.

In one illustrative example, the laser device may generate qubits using the horizontal and vertical polarization states as one quantum basis and the two circular photon polarization states (which are linear combinations of the vertical and horizontal photon polarization states) as another quantum basis. These qubits are then sent from the laser device, through the PM switch, to a server. The server may have no network communication with the laser device and, as such, may not know the quantum basis or bases in which these qubits were encoded. Accordingly, the server may use its own quantum basis (e.g., a pseudo-random quantum basis) to measure these qubits. For example, the server might measure every photon in the quantum basis of vertical and horizontal polarization state. Each time the server uses the wrong quantum basis to measure the photon polarization state, the server has a probability (e.g., fifty percent chance) of decoding the correct bit according to the quantum uncertainty principle. Accordingly, the bit pattern that the server regenerates is inherently random and can be used as a session key. Alternatively the generated bit pattern could be used as a seed for PRNG.

In some embodiments, each server may use its own arbitrary quantum basis to decode qubits. In other embodiments, all of the servers may use the same quantum basis order or pattern. Due to quantum uncertainty, each time the quantum basis of any server is not the same as the quantum basis of the laser device, the qubit will be measured randomly at each server and thus each server will generate a different binary number. Even a single server measuring the same qubit sequence twice will generate two different binary numbers which are random in nature.

In some embodiments, a system for centralized quantum session authentication is provided whose operations comprise transmitting single photon pulses from a central cloud-based system to a plurality of servers wherein the quantum bases used for encoding and decoding are different or the photons are not in a particular polarization state and thereby generating a bit stream that is inherently random. The bit stream may be used as a session key or otherwise used for session authentication.

There are many advantages of these and other embodiments described herein, such as: providing a session key that has truly random elements, and, as a result, facilitating the generation of a session key that cannot be reproduced by a third party. The session key or the seed generated in this way is inherently random and is unattainable to any perpetrator due to quantum uncertainty.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, such as pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "optical line" refers to an optical communications path. For example, an optical line may comprise an optical fiber, an optical waveguide, a fiber optic cable, a non-polarization maintaining optical fiber, a quantum line, or a combination thereof.

The term "quantum line" refers to a quantum communications path. For example, a quantum line may comprise a polarization-maintaining optical fiber (PMF or PM fiber), free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible.

The terms "qubit encoder" and "qubit decoder" are used herein to refer to any devices that respectively encode or decode a qubit of information on a photon. In this regard, the qubit encoder and qubit decoder may comprise optoelectronic devices as described below.

The terms "optoelectronic device," "optoelectronic component," "laser device," "light source," "single photon source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more qubit encoders, qubit decoders, switching devices, PRNG generating devices, server devices, remote server devices, cloud-based server devices, cloud utilities, or other devices.

Figure 1B:
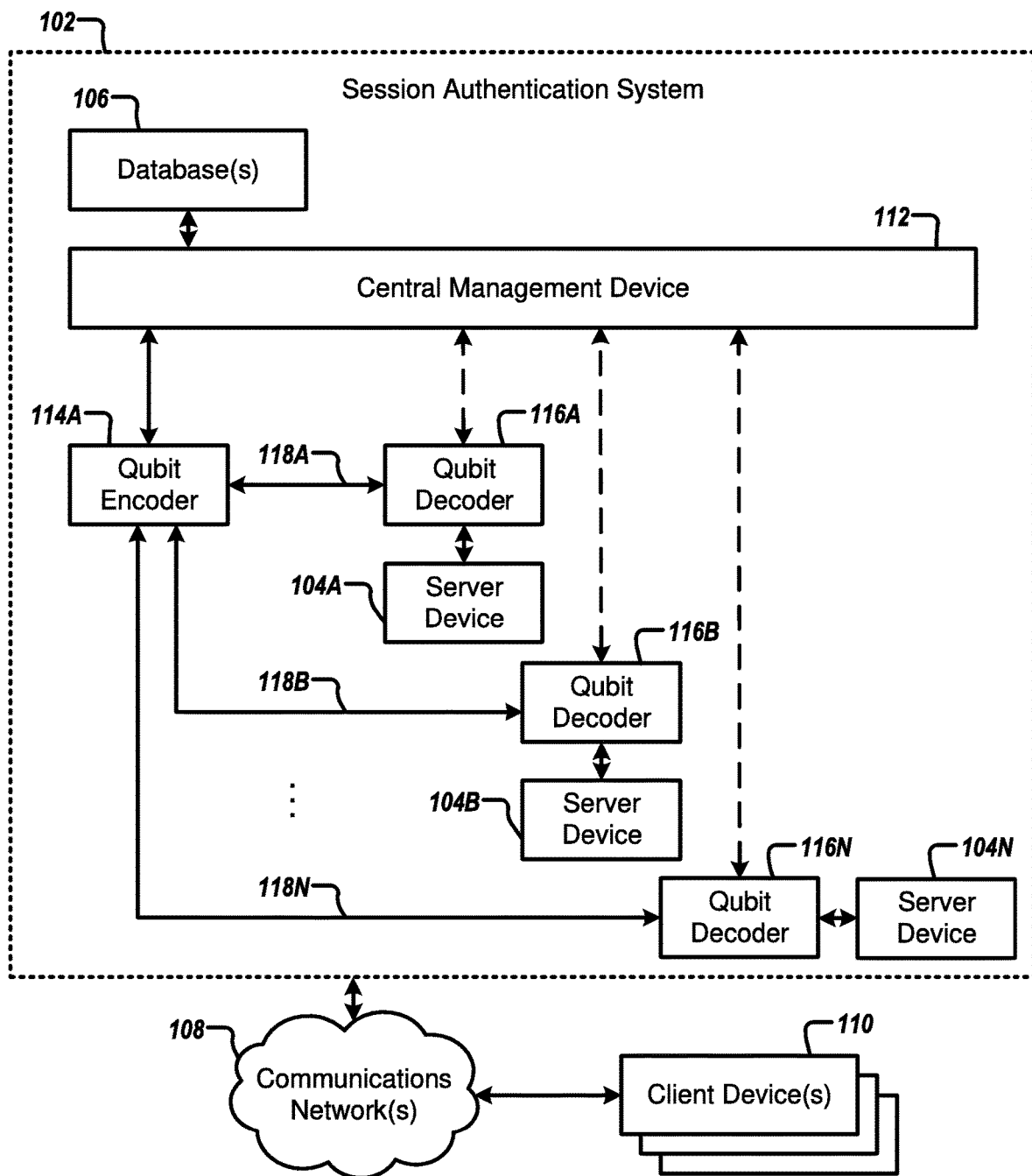
Figure 1C:
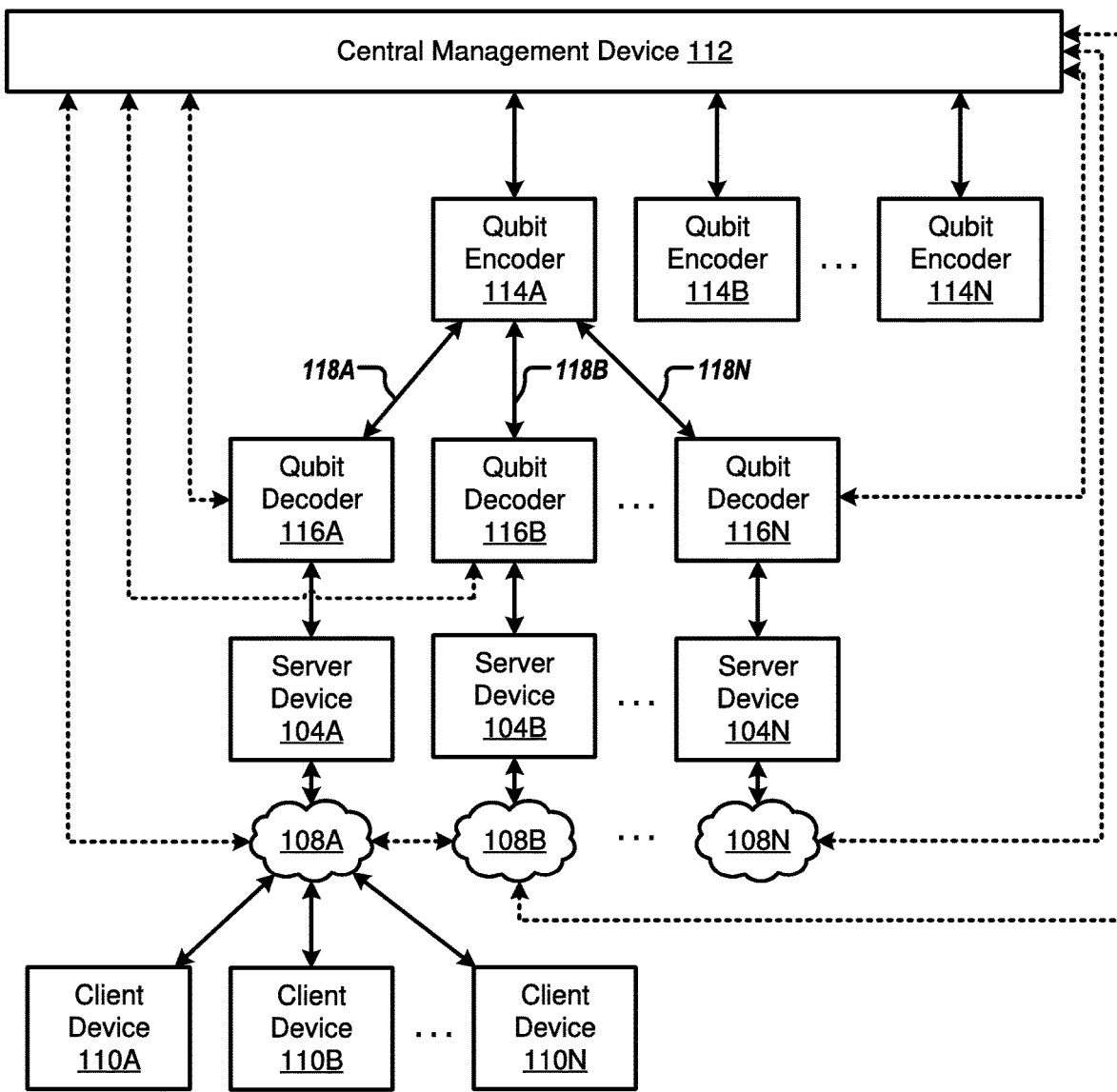
Figure 1D:
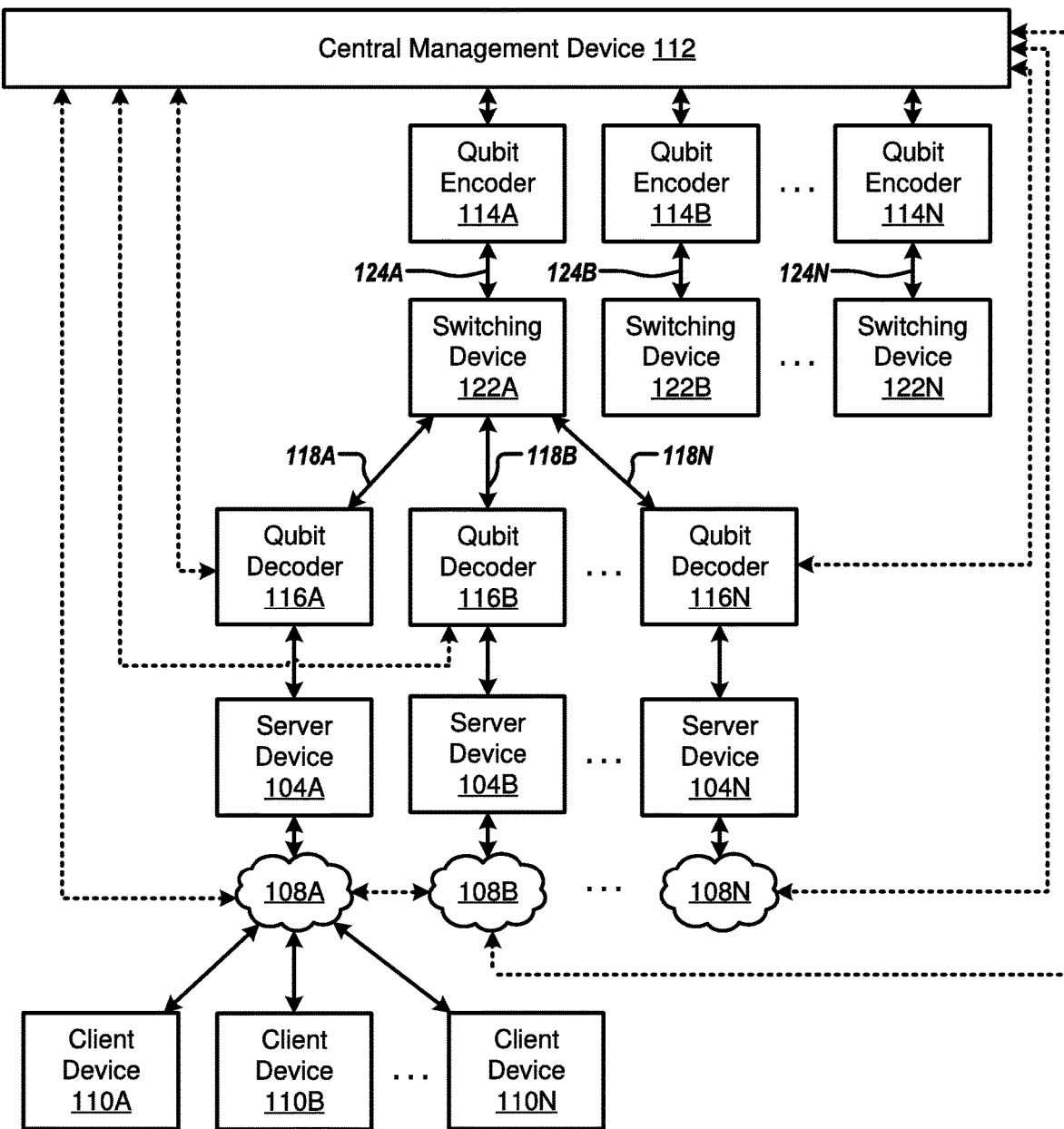

FIGS. 1A-1D illustrate system diagrams of sets of devices that may be involved in some example embodiments described herein. In this regard, FIG. 1A discloses an example environment 100 within which embodiments of the present disclosure may operate to authenticate sessions between devices. FIG. 1B discloses an alternative example environment 120 within which embodiments of the present disclosure may operate to authenticate sessions between devices. FIG. 1C discloses another alternative example environment 140 within which embodiments of the present disclosure may operate to authenticate sessions between devices. FIG. 1D discloses another alternative example environment 160 within which embodiments of the present disclosure may operate to authenticate sessions between devices.

As illustrated in FIGS. 1A-1D, a session authentication system 102 may include one or more session authentication system server devices 104 (e.g., 104A-104N) in communication with one or more session authentication system databases 106. The session authentication system 102 may be embodied as one or more computers or computing systems as described herein. The session authentication system 102 may be in communication with one or more client devices 110 (e.g., 110A-110N), central management device 112, one or more qubit encoders 114 (e.g., 114A-114N), one or more qubit decoders 116 (e.g., 116A-116N), or a combination thereof through one or more communications networks 108 (e.g., 108A-108N). One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof.

In some embodiments, the session authentication system 102 may generate session IDs for secure authentication of communication sessions between any of the one or more client devices 110 and one or more other devices (e.g., one or more session authentication system server devices 104, or one or more other devices not shown in FIGS. 1A-1D). To generate a particular session ID, the session authentication system 102 may invoke use of the central management device 112, one or more qubit encoders 114, and one or more qubit decoders 116, as described below.

The one or more session authentication system server devices 104 may be embodied as one or more servers, remote servers, cloud-based servers (e.g., cloud utilities), processors, or any other suitable server devices, or any combination thereof. The one or more session authentication system server devices 104 receive, process, generate, and transmit data, signals, and electronic information to facilitate the operations of the session authentication system 102. The one or more session authentication system server devices 104 may include, for example, session authentication system server device 104A, session authentication system server device 104B, through session authentication system server device 104N, where N represents an alphabetic, numeric, or alphanumeric identifier. For example, in some instances the one or more session authentication system server devices 104 may include over 100,000 session authentication system servers.

The one or more session authentication system databases 106 may be embodied as one or more data storage devices, such as a Network Attached Storage (NAS) device or devices, or as one or more separate databases or servers. The one or more session authentication system databases 106 may store information received, retrieved, accessed, and generated by the session authentication system 102 to facilitate the operations of the session authentication system 102. For example, the one or more session authentication system databases 106 may store control signals, electronic information indicative of one or more quantum bases, time-dependent quantum encoding schedules, time-dependent quantum decoding schedules, unit-dependent quantum encoding schedules, unit-dependent quantum decoding schedules, pseudo-random quantum basis selection techniques, and combinations thereof. In another example, the one or more session authentication system databases 106 may store device characteristics, and user account credentials for the central management device 112, one or more of the one or more qubit encoders 114, one or more of the one or more qubit decoders 116, or a combination thereof. In another example, the one or more session authentication system databases 106 may store device characteristics and user account credentials for one or more of the one or more client devices 110.

The one or more client devices 110 (e.g., 110A-110N) may be embodied by any computing device known in the art. Information received by the session authentication system 102 from the one or more client devices 110 may be provided in various forms and via various methods. For example, the one or more client devices 110 may be laptop computers, smartphones, netbooks, tablet computers, wearable devices, desktop computers, electronic workstations, automated transaction machines (ATMs), or the like, and the information may be provided to the session authentication system 102 through various modes of data transmission provided by these client devices. In some embodiments, the one or more client devices 110 may include or store various data and electronic information associated with one or more users. In some embodiments, the one or more client devices 110 may include, for example, client device 110A (e.g., a smartphone), client device 110B (e.g., a laptop computer), through client device 110N (e.g., an ATM), where N represents an alphabetic, numeric, or alphanumeric identifier. For example, in some instances the one or more client devices 110A-110N may include over 1,000,000 client devices, and the session authentication system 102 may authenticate over 1,000,000 sessions per hour.

In embodiments where a client device 110 is a mobile device, such as a smartphone or tablet, the mobile device may execute an "app" (e.g., a thin-client application) to interact with the session authentication system 102, one or more session authentication system server devices 104, or a combination thereof. In some embodiments, the mobile device may comprise a mobile operating system that provides for improved communication interfaces for interacting with external devices. Communication with hardware and software modules executing outside of the app may be provided via APIs provided by the mobile device operating system.

The central management device 112 may be embodied as one or more computers or computing systems as known in the art. For instance, the central management device 112 may be embodied as one or more servers, remote servers, cloud-based servers (e.g., cloud utilities), processors, or any other suitable server devices, or any combination thereof. In some embodiments, the central management device 112 may include or store various data and electronic information. For example, the central management device 112 may store control signals, electronic information indicative of one or more quantum bases, time-dependent quantum encoding schedules, time-dependent quantum decoding schedules, unit-dependent quantum encoding schedules, unit-dependent quantum decoding schedules, pseudo-random quantum basis selection techniques, and combinations thereof. In another example, the central management device 112 may store one or more databases, tables, or maps of quantum bases; links or pointers to one or more quantum bases contained therein; and combinations thereof. In another example, the central management device 112 may store device characteristics, and user account credentials for the central management device 112, one or more of the one or more qubit encoders 114, one or more of the one or more qubit decoders 116, or a combination thereof. In another example, the central management device 112 may store device characteristics and user account credentials for one or more of the one or more client devices 110.

In some embodiments, the central management device 112 may be configurable by a user using a computing device. For example, the user may use the computing device to control how the central management device 112 determines the various quantum bases and schedules described herein. For example, the user may use the computing device to increase or decrease the complexity of the quantum basis determination process used by the central management device 112. In one illustrative example, the user may use the computing device to instruct the central management device 112 to utilize a first quantum basis determination process (e.g., that increases the amount of quantum bases in the first set of quantum bases to two or more quantum bases; that increases the amount of quantum bases in the second set of quantum bases to two or more quantum bases; or both) when client device 110A requires a highly secure session, such as when client device 110A is accessing a financial website or when client device 110A is associated a geolocation requiring higher security. In another illustrative example, the user may use the computing device to instruct the central management device 112 to utilize a second quantum basis determination process (e.g., that decreases the amount of quantum bases in the first set of quantum bases to one quantum basis; that decreases the amount of quantum bases in the second set of quantum bases to one quantum basis; or both) when client device 110B requires less secure session, such as when client device 110B is accessing a content browsing website.

In some embodiments, the central management device 112 may be connected the session authentication system 102 either directly or via one or more communications networks 108. In some embodiments (e.g., as shown in FIG. 1B), the central management device 112 may be a component of the session authentication system 102. However, in other embodiments, the central management device 112 is not a part of or connected, directly or indirectly, to the session authentication system 102 in order to prevent communication of information regarding the quantum encoding or decoding procedures outlined herein between the central management device 112 and the session authentication system 102. The central management device 112 may include one or more databases (not shown for brevity) storing sets of quantum bases, control signals, device characteristics, and user account credentials for one or more of the one or more qubit encoders 114, one or more of the one or more qubit decoders 116, or a combination thereof.

The central management device 112 may be connected to one or more qubit encoders 114 (e.g., 114A-114N). In various embodiments, one or more of these connections may be through the one or more communications networks 108. In other embodiments, one or more of these connections may be a direct connection through a non-network communications path (e.g., a direct wired or wireless communications path). In some embodiments, the qubit encoder 114 may be a component of the central management device 112, rather than a separate device, although it is illustrated as a separate device in FIGS. 1A-1D for ease of explanation. Qubit encoder 114, in turn, is connected to one or more qubit decoders 116 (e.g., 116A-116N) through one or more quantum lines 118 (e.g., 118A-118N). In some embodiments, the one or more quantum lines 118 may comprise one or more non-polarization maintaining optical fibers to introduce additional error (e.g., to scramble the qubits transmitted through the fiber). The one or more qubit decoders 116, in turn, may be connected to session authentication system 102. In various embodiments, one or more of these connections may be through the one or more communications networks 108. In other embodiments, one or more of these connections may be a direct connection through a non-network communications path (e.g., a direct wired or wireless communications path). In some embodiments, the qubit decoder 116 may be a component of the of the central management device 112 rather than a separate device, although it is illustrated as a separate device in FIGS. 1A-1D for ease of explanation.

Each of the one or more qubit encoders 114 may be embodied by any suitable qubit encoder, such as an opto-electronic device (e.g., a PLM; a laser device). In some embodiments, the qubit encoder 114 may include or store various data and electronic information. For example, the qubit encoder 114 may include or store one or more control signals, electronic information indicative of one or more quantum bases, time-dependent quantum encoding schedules, unit-dependent quantum encoding schedules, pseudo-random quantum basis selection techniques, or any combination thereof. Alternatively, some or all of this information may be stored in the central management device 112, the session authentication system 102, or a combination of the central management device 112 and the session authentication system 102. In some embodiments, the qubit encoder 114 may comprise modulating circuitry configured to generate photon pulses and transmit the generated photon pulses over a quantum line 118, wherein the photons are not polarized. In some embodiments, the qubit encoder 114 may include programmable firmware for receiving control signals and electronic instructions. In some embodiments, the qubit encoder 114 may be configured to encode, based on a first set of quantum bases (that are stored locally by the qubit encoder 114 or received from the central management device 112), a first set of bits received from the central management device 112 to generate a set of qubits. The qubit encoder 114 may be further configured to transmit the set of qubits to the qubit decoder 116 over a quantum line 118. In some embodiments, the qubit encoder 114 may be configured to transmit electronic information indicative of the first set of quantum bases to qubit decoder 116, the session authentication system 102, or both. In some embodiments, the qubit encoder 114 may be configured to not transmit any electronic information indicative of the first set of quantum bases. In some embodiments, the first set of quantum bases is not transmitted by the qubit encoder 114. In some embodiments, the one or more qubit encoders 114 may include, for example, qubit encoder 114A, qubit encoder 114B, through qubit encoder 114N, where N represents an alphabetic, numeric, or alphanumeric identifier. For example, in some instances the one or more qubit encoders 114A-114N may include over 100,000 qubit encoders.

Each of the one or more qubit decoders 116 may be embodied by any suitable qubit decoder, such as an opto-electronic device (e.g., a PLD). In some embodiments, the qubit decoder 116 may include or store various data and electronic information. For example, the qubit decoder 116 may include or store one or more control signals, electronic information indicative of one or more quantum bases, time-dependent quantum decoding schedules, unit-dependent quantum decoding schedules, pseudo-random quantum basis selection techniques, or any combination thereof. Alternatively, some or all of this information may be stored in the central management device 112, the session authentication system 102, or a combination of the central management device 112 and the session authentication system 102. The qubit decoder 116 is communicatively coupled to the qubit encoder 114 by the quantum line 118 and is configured to receive a set of qubits from the qubit encoder 114 over the quantum line 118. In some embodiments, the qubit decoder 116 may comprise bit manipulator circuitry configured to convert the qubit measurement into a stream of classical bits. The qubit decoder 116 may be further configured to decode the received set of qubits based on a second set of quantum bases different from the first set of quantum bases used to encode the set of qubits to generate a second set of bits. The second set of bits will thus include a random component insofar as at least one qubit has been encoded with a first quantum basis and was then decoded using a second quantum basis different from the first quantum basis. When this divergence of quantum bases occurs for multiple qubits, the second set of bits may comprise a plurality of wildcard bits due to the effect of quantum uncertainty introduced into the system by the premeditated use of divergent quantum bases for encoding and decoding of the set of qubits. As discussed in further detail with respect to FIGS. 3 and 4, each wildcard bit has some probability of being an error bit based on quantum uncertainty. In some embodiments, the first set of quantum bases is not received by the qubit decoder 116. In some embodiments, the one or more qubit decoders 116 may include, for example, qubit decoder 116A, qubit decoder 116B, through qubit decoder 116N, where N represents an alphabetic, numeric, or alphanumeric identifier. For example, in some instances the one or more qubit decoders 116A-116N may include over 100,000 qubit decoders.

In some embodiments, the qubit encoder 114 may be a cloud-based centralized qubit encoder that does not encode the qubits. Rather, the qubit encoder 114 may transmit pulses of single photons to one or more qubit decoders 116. A qubit decoder 116 may receive the pulses of single photons and use any (e.g., arbitrary) set of quantum bases to measure the polarization of the photon pulses and decode qubits. Since the received photons are not polarized, the polarization measurement at the qubit decoder 116 results in completely random decoded bits even if the qubit decoder uses only one quantum basis to decode all the qubits.

Turning to FIGS. 1B-1D, in some embodiments each qubit encoder 114 may be communicatively coupled to a plurality of qubit decoders 116. For example, as shown in FIGS. 1B and 1C, qubit encoder 114A may be communicatively coupled to qubit decoder 116A through quantum line 118A; qubit encoder 114A may be communicatively coupled to qubit decoder 116B through quantum line 118B; and qubit encoder 114A may be communicatively coupled to qubit decoder 116N through quantum line 118N. The one or more qubit decoders 116A-116N are, in turn, communicatively coupled to one or more session authentication system server devices 104A-104N. Each session authentication system server device 104A-104N may be in communication with one or more client devices 110A-110N through one or more communications networks 108A-108N, one or more non-network communications paths, or a combination thereof. Each session authentication system server device 104A-104N may generate session IDs based on data received from corresponding qubit decoders 116A-116N to facilitate secure authentication of communication sessions between the corresponding session authentication system server devices 104A-104N and one or more client devices communicatively coupled to one or more communications networks 108A-108N as described in further detail herein. For example, session authentication system server device 104A may generate session IDs based on data received from corresponding qubit decoder 116A to facilitate secure authentication of communication sessions between the session authentication system server device 104A and the one or more client devices 110A-110N communicatively coupled to one or more communications networks 108A. In another example, session authentication system server device 104B may generate session IDs based on data received from corresponding qubit decoder 116B to facilitate secure authentication of communication sessions between the session authentication system server device 104B and one or more client devices communicatively coupled to one or more communications networks 108B. In another example, session authentication system server device 104N may generate session IDs based on data received from corresponding qubit decoder 116N to facilitate secure authentication of communication sessions between the session authentication system server device 104N and one or more client devices communicatively coupled to one or more communications networks 108N.

In some embodiments, the qubit encoder 114A may be a cloud-based centralized qubit encoder configured to encode a set of qubits using a set of quantum bases and transmit (e.g., over one or more quantum lines 118A-118N; over one or more quantum lines 124A-124N to one or more switching devices 122A-122N and over one or more quantum lines 118A-118N) the qubits to a plurality of qubit decoders 116A-116N communicatively coupled to a plurality of session authentication system server devices 104A-104N. In some embodiments, the one or more quantum lines 124 may comprise one or more non-polarization maintaining optical fibers to introduce additional error (e.g., to scramble the qubits transmitted through the fiber). In response, each of the plurality of qubit decoders 116A-116N may use their own quantum bases to decode the received qubits, generate a decoded set of bits, and transmit the decoded set of bits to a respective one of the plurality of session authentication system server devices 104A-104N.

In some embodiments, the one or more session authentication system server devices 104A-104N may be located within a server farm. For example, session authentication system server device 104A and session authentication system server device 104B may be located within the walls of a building warehouse of a server farm or otherwise within a geographic footprint of the server farm. In some embodiments, the one or more qubit decoders 116A-116N may be located within the server farm. In some embodiments, the one or more qubit decoders 116A-116N may be located outside the server farm. For example, the one or more qubit decoders 116A-116N may be located outside the geographic footprint of the server farm. In some embodiments, the one or more qubit encoders 114A-114N may be located within the server farm. In some embodiments, the one or more qubit encoders 114A-114N may be located outside the server farm. For example, the one or more qubit encoders 114A-114N may be located outside the geographic footprint of the server farm.

In some embodiments, as shown in FIG. 1D, each qubit encoder 114A-114N may be communicatively coupled to one or more switching devices 122A-122N through one or more quantum lines 124A-124N. For example, qubit encoder 114A may be communicatively coupled to one or more switching devices 122A at least partially through quantum line 124A; qubit encoder 114B may be communicatively coupled to one or more switching devices 122B at least partially through quantum line 124B; and qubit encoder 114N may be communicatively coupled to one or more switching devices 122N at least partially through quantum line 124N. In some embodiments, each switching device 122A-122N may be communicatively coupled to one or more qubit decoders 116A-116N through one or more quantum lines 118A-118N. For example, one or more switching devices 122A may be communicatively coupled to qubit decoder 116A at least partially through quantum line 118A; one or more switching devices 122A may be communicatively coupled to qubit decoder 116B at least partially through quantum line 118B; and one or more switching devices 122A may be communicatively coupled to qubit decoder 116N at least partially through quantum line 118N.

In some embodiments, the qubit encoder 114A may be configured to transmit an encoded set of qubits to the one or more switching devices 122A over one or more quantum lines 124A. The one or more switching devices 122A may in turn be further configured to transmit the set of qubits to a corresponding qubit decoder 116A-116N over a corresponding quantum line 118A-118N. In some such embodiments, the qubit encoder 114A may be configured to not transmit any electronic information indicative of the first set of quantum bases. For example, the qubit encoder 114A may be without network connection capability and incapable of communicating with a communications network (e.g., one or more communications networks 108) or even with other components within the session authentication system 102. When foregoing network connection capability in this fashion, a qubit encoder 114A is incapable of transmitting the quantum basis or set of quantum bases used to generate qubits, and communications security is, in some instances, improved because a perpetrator may not be able to acquire that quantum basis or those quantum bases. In some embodiments, the first set of quantum bases is not transmitted by the qubit encoder 114A.

The one or more switching devices 122 (e.g., 122A-122N) may be embodied by any suitable switching device, such as a polarization-maintaining (PM) switching device, an optical switching device, an electro-optical switching device, a microelectromechanical systems (MEMS) switching device, a PM fiber coupling, a splitter, or any other suitable device. In some instances, the one or more switching devices 122 may comprise one or more PM switches that are non-mechanical, operate with all optical fast-switching components with less than 0.5 dB of loss, and have been tested over millions of PM switches without a loss in a single polarization state. In some instances, the one or more switching devices 122 may comprise one or more all-optical PM switches that use polarization maintaining couplers and PM fibers to achieve very high speed modulation with no loss of polarization state. In some embodiments, each of the one or more switching devices 122 may be embodied by a plurality of cascading switching devices. For example, the one or more switching devices 122A may be embodied by three cascading switching devices. In some embodiments, polarization-maintaining fiber and switches may be used to ensure that the state of the photon is maintained and to provide for estimation of the level of randomness.

In some embodiments, the one or more switching devices 122A may be configured to receive qubits from a qubit encoder 114A over one or more quantum lines 124A. In some embodiments, the one or more switching devices 122A may be configured to transmit subsets of received qubits to qubit decoders 116A-116N by switching between quantum lines 118A-118N. In some embodiments, the one or more switching devices 122A may be configured to switch between quantum lines 118A-118N at a frequency greater than one megahertz (MHz). In some embodiments, the one or more switching devices 122A may be configured to switch between quantum lines 118A-118N at a frequency greater than one megahertz (MHz). In these embodiments, the session authentication system 102 may be configured to authenticate over 100,000 sessions at the same time (or at nearly the same time).

In some embodiments, the one or more qubit decoders 116A-116N are communicatively coupled to the qubit encoder 114A via a combination including quantum line 124A, switching device 122A, and a corresponding one of quantum lines 118A-118N. The one or more qubit decoders 116A-116N are configured to receive a set of qubits from the qubit encoder 114A via the quantum line 124A, the switching device 122A, and the corresponding quantum lines 118A-118N. In some embodiments, the first set of quantum bases is not received by the one or more qubit decoders 116A-116N.

In one illustrative embodiment, a qubit encoder 114A may be configured to generate, based on a first set of quantum bases, a set of qubits comprising a first subset of qubits and a second subset of qubits, and transmit the set of qubits to switching device 122A over quantum line 124A. In some instances, the first set of quantum bases is not transmitted by the qubit encoder 114A. The switching device 122A may be in communication with the qubit encoder 114A over the quantum line 124A and configured to receive the set of qubits from the qubit encoder 114A over the first quantum line 124A. The switching device 122A may be further configured to transmit the first subset of qubits to qubit decoder 116A over quantum line 118A, and transmit the second subset of qubits to qubit decoder 116B over quantum line 118B. The qubit decoder 116A may be in communication with the switching device 122A over the quantum line 118A and configured to: receive the first subset of qubits from the switching device 122A over the quantum line 118A; and decode, based on a second quantum basis different from the first quantum basis, the first subset of qubits to generate a first set of bits, wherein the first set of bits comprises a first plurality of wildcard bits. The qubit decoder 116A may thereafter transmit the first set of bits to a corresponding session authentication system server device 104A that is configured to generate a first number based on the first set of bits and authenticate a first session based on the generated first number. The qubit decoder 116B may be in communication with the switching device 122A over the quantum line 118B and configured to: receive the second subset of qubits from the switching device 122A over the quantum line 118B; and decode, based on a third quantum basis different from the first quantum basis, the second subset of qubits to generate a second set of bits. The third quantum basis may be the same as, or different from, the second quantum basis. The qubit decoder 116B may thereafter transmit the second set of bits to a corresponding session authentication system server device 104B that is configured to generate a second number based on the second set of bits and authenticate a second session based on the generated second number.

Turning back to FIGS. 1A-1D, in some embodiments, the session authentication system 102, the central management device 112, or both may provide for determining a first set of quantum bases, generating a first control signal indicative of the first set of quantum bases, and transmitting the first control signal over one or more communications networks 108 to qubit encoder 114. The session authentication system 102, the central management device 112, or both may provide for determining a second set of quantum bases, generating a second control signal indicative of the second set of quantum bases, and transmitting the second control signal over one or more communications networks 108 to qubit decoder 116. The session authentication system 102, the central management device 112, or both may provide for generating a third control signal indicative of an instruction to encode a set of bits and transmitting the third control signal one or more communications networks 108 to qubit encoder 114.

In some embodiments, the central management device 112 may be configured to determine a first set of quantum bases, generate a first control signal indicative of the first set of quantum bases, and transmit the first control signal to qubit encoder 114A. In some embodiments, the central management device 112 may be configured to determine a second set of quantum bases, generate a second control signal indicative of the second set of quantum bases, and transmit the second control signal to qubit decoder 116A and qubit decoder 116B. In some embodiments, the central management device 112 may be configured to generate a third control signal indicative of an instruction to encode a set of bits and transmit the third control signal to qubit encoder 114A. In some embodiments, the qubit encoder 114A may be configured to receive the first control signal and the third control signal and, in response to receipt of the third control signal, encode the set of bits based on the first set of quantum bases to generate a set of qubits. In some embodiments, the qubit encoder 114A may be configured to transmit the set of qubits over quantum line 118A to qubit decoder 116A. In some embodiments, the qubit decoder 116A may be configured to receive the second control signal. In some embodiments, the qubit decoder 116A may be configured to receive the set of qubits over the quantum line 118A and decode the set of qubits based on the second set of quantum bases to generate a decoded set of bits. In some embodiments, the qubit decoder 116A may be configured to transmit the decoded set of bits to session authentication system server device 104A.

In some embodiments, the central management device 112 may be configured to transmit, to qubit encoder 114A, a first control signal indicative of a first quantum basis or a first set of quantum bases (e.g., a set of zero or more quantum bases). The qubit encoder 114A may store the first control signal in memory. In some embodiments, the central management device 112 may be configured to transmit, to qubit decoder 116A, a second control signal indicative of a second quantum basis or a second set of quantum bases (e.g., a set of zero or more quantum bases). The qubit decoder 116A may store the second control signal in memory. In some embodiments, the central management device 112 may be configured to transmit, to qubit encoder 114A, a third control signal indicative of an instruction to encode a set of bits (e.g., based on the first quantum basis or the first set of quantum bases). In response to receipt of the third control signal, the qubit encoder 114A may retrieve the first quantum basis or the first set of quantum bases. In some embodiments, the central management device 112 may be configured to transmit, to qubit encoder 114A, a fourth control signal indicative of an instruction to decode a set of qubits (e.g., based on the second quantum basis or the second set of quantum bases; based on a third quantum basis or a third set of quantum bases; based on a fourth quantum basis or a fourth set of quantum bases). In some embodiments, each qubit decoder 116 may be communicatively coupled to a session authentication system server device 104. For example, qubit decoder 116A may be communicatively coupled to session authentication system server device 104A; qubit decoder 116B may be communicatively coupled to session authentication system server device 104B; and qubit decoder 116N may be communicatively coupled to session authentication system server device 104N.

In some instances, the qubit encoder 114A may retrieve the first quantum basis or the first set of quantum bases from local memory in response to receiving the third control signal. In other instances, the first control signal may comprise one or more links or pointers to the first quantum basis or the first set of quantum bases contained in a database of quantum bases, a table of quantum bases, or a map of quantum bases stored in remote memory (e.g., central management device 112, one or more session authentication system databases 106, or both). The qubit encoder 114A may retrieve the first quantum basis or the first set of quantum bases from the remote memory based on the one or more links or pointers. In still other instances, the qubit encoder 114A may generate the first quantum basis or the first set of quantum bases on the fly (e.g., in response to processing the third control signal). In still other instances, the qubit encoder 114A may receive the first quantum basis or the first set of quantum bases from a third-party device.

In some instances, the qubit decoder 116A may retrieve the second quantum basis or the second set of quantum bases from local memory in response to receiving the set of qubits. In other instances, the second control signal may comprise one or more links or pointers to the second quantum basis or the second set of quantum bases contained in the database of quantum bases, the table of quantum bases, or the map of quantum bases stored in the remote memory, or in a separate database of quantum bases, table of quantum bases, or map of quantum bases stored in remote memory (e.g., central management device 112, one or more session authentication system databases 106, or both). The qubit decoder 116A may retrieve the second quantum basis or the second set of quantum bases from the remote memory based on the one or more links or pointers. In still other instances, the qubit decoder 116A may generate the second quantum basis or the second set of quantum bases on the fly (e.g., in response to receiving the set of qubits; in response to processing the fourth control signal). In still other instances, the qubit decoder 116A may receive the second quantum basis or the second set of quantum bases from a third-party device.

Each of the one or more session authentication system server devices 104A-104N may be configured to authenticate a session based on a generated number. In some embodiments, each of the one or more session authentication system server devices 104A-104N may be configured to generate a session key based on the generated number. In some embodiments, the one or more session authentication system server devices 104A-104N may be configured to generate a seed for pseudo-random number generation based on the generated number, and generate a pseudo-random number based on the seed, wherein generation of the session key is based on the pseudo-random number. In some instances, the generated number is the session key.

In some embodiments, each session authentication system server device 104 may be communicatively coupled to a plurality of client devices. For example, session authentication system server device 104A may be communicatively coupled to a first set of client devices comprising client device 110A, client device 110B, and client device 110N; session authentication system server device 104B may be communicatively coupled to a second set of client devices; and session authentication system server device 104N may be communicatively coupled to a third set of client devices.

In some embodiments, the one or more session authentication system server devices 104A-104N may use a generated session key to authenticate a session between the one or more session authentication system server devices 104A-104N and one or more client devices 110A-110N. For example, session authentication system server device 104A may generate a first session key to authenticate a session between session authentication system server device 104A and one of client devices 110, and session authentication system server device 104B may generate a second session key to authenticate a session between session authentication system server device 104B and another of client devices 110. In another example, a single session authentication system server device 104A may generate a first session key to authenticate a session between session authentication system server device 104A and client device 110A, and may also generate a second session key to authenticate a session between session authentication system server device 104A and client device 110B.

The one or more client devices 110A-110N may be embodied by any computing device known in the art. In some embodiments, the one or more client devices 110A-110N may comprise or be coupled to one or more laptop computers, smartphones, netbooks, tablet computers, wearable devices desktop computers, electronic workstations, kiosks, automated transaction machines (ATMs), or the like. The session authentication system 102 may receive information from, and transmit information to, the one or more client devices 110A-110N. For example, the session authentication system 102 may authenticate sessions between the one or more session authentication system server devices 104A-104N and the one or more client devices 110A-110N. It will be understood that in some embodiments, the client devices 110A-110N need not themselves be client devices, but may be peripheral devices communicatively coupled to client devices.

In one illustrative embodiment, a user may use client device 110A to log in to a website that utilizes one or more cookies. In response to client device 110A logging in to the website, session authentication system server device 104A may determine to create a session, generate a request for a random number, and transmit the request for the random number to the central management device 112. The central management device 112 may receive the request for the random number and initiate a process based on any of the various embodiments or combination of embodiments described herein that results in generation, by qubit decoder 116A, of a decoded set of bits. The qubit decoder 116A may then transmit the decoded set of bits to the session authentication system server device 104A. The session authentication system server device 104A may receive the decoded set of bits, generate a session key based on the decoded set of bits, and transmit (or, in some instances, perform a quantum key distribution process that includes transmitting) the session key to client device 110A for use in session authentication.

In some embodiments, the qubit encoder 114 and the qubit decoder 116 may be configured to respectively encode and decode various qubits of the set of qubits based on multiple quantum bases, such as a first quantum basis, a second quantum basis different from the first quantum basis, and in some embodiments, additional quantum bases different from the first or the second quantum bases. The difference in quantum basis used for encoding and decoding of a particular qubit may thus manifest in several arrangements. For instance, a first quantum basis used for encoding of a qubit may comprise a first pair of orthogonal photonic polarization states selected at least partially from the group consisting of a pair of rectilinear photonic polarization states, a pair of diagonal photonic polarization states, and a pair of circular photonic polarization states; and a second quantum basis used for decoding of the qubit may comprise a second pair of orthogonal photonic polarization states selected at least partially from the group but that are different from the first pair of orthogonal photonic polarization states.

In some embodiments, the qubit encoder 114 and the qubit decoder 116 may be configured to respectively encode and decode various qubits of the set of qubits based on multiple quantum basis, such as a first quantum basis, a second quantum basis different from the first quantum basis, and also a third quantum basis different from the first or the second quantum bases. In some instances, the third quantum basis may be the same as, or different from, the first quantum basis. For example, the first quantum basis may comprise a first pair of orthogonal photonic polarization states selected at least partially from the group consisting of a pair of rectilinear photonic polarization states, a pair of diagonal photonic polarization states, and a pair of circular photonic polarization states; the second quantum basis may comprise a second pair of orthogonal photonic polarization states different from the first pair of orthogonal photonic polarization states and selected from the same group; and the third quantum basis may comprise a third pair of orthogonal photonic polarization states different from the second pair of orthogonal photonic polarization states and selected from the same group. In one illustrative example, the first quantum basis may be the rectilinear basis, the second quantum basis may be the diagonal basis, and the third quantum basis may be the rectilinear basis or the circular basis. In another illustrative example, the first quantum basis may be the rectilinear basis, the second quantum basis may be the circular basis, and the third quantum basis may be the rectilinear basis or the diagonal basis. In yet another illustrative example, the first quantum basis may be the diagonal basis, the second quantum basis may be the rectilinear basis, and the third quantum basis may be the diagonal basis or the circular basis. In yet another illustrative example, the first quantum basis may be the diagonal basis, the second quantum basis may be the circular basis, and the third quantum basis may be the rectilinear basis or the diagonal basis. In yet another illustrative example, the first quantum basis may be the circular basis, the second quantum basis may be the rectilinear basis, and the third quantum basis may be the diagonal basis or the circular basis. In yet another illustrative example, the first quantum basis may be the circular basis, the second quantum basis may be the diagonal basis, and the third quantum basis may be the rectilinear basis or the circular basis.

In some embodiments, the qubit decoder 116 may be configured to decode the set of qubits based on the second quantum basis, a third quantum basis different from the second quantum basis, and a fourth quantum basis different from the second quantum basis and also different from the third quantum basis. In some instances, the fourth quantum basis may be the same as, or different from, the first quantum basis. For example, the first quantum basis may comprise a pair of orthogonal photonic polarization states selected at least partially from the group consisting of a pair of rectilinear photonic polarization states, a pair of diagonal photonic polarization states, and a pair of circular photonic polarization states; the second quantum basis may comprise the pair of rectilinear photonic polarization states; the third quantum basis may comprise the pair of diagonal photonic polarization states; and the fourth quantum basis may comprise the pair of circular photonic polarization states. In one illustrative example, the first quantum basis may be the rectilinear basis, the second quantum basis may be the rectilinear basis, the third quantum basis may be the diagonal basis, and the fourth quantum basis may be the rectilinear basis or the circular basis. In another illustrative example, the first quantum basis may be the diagonal basis, the second quantum basis may be the rectilinear basis, the third quantum basis may be the diagonal basis, and the fourth quantum basis may be the rectilinear basis or the circular basis. In yet another illustrative example, the first quantum basis may be the circular basis, the second quantum basis may be the rectilinear basis, the third quantum basis may be the diagonal basis, and the fourth quantum basis may be the rectilinear basis or the circular basis.

The qubit decoder 116 is configured to transmit, to the session authentication system 102, the second set of bits generated by decoding the received set of qubits. This transmission may occur either via one or more communications networks 108 or via a non-network communication path (although in embodiments where the qubit decoder 116 comprises a component of the session authentication system 102, internal conveyance of the second set of bits may occur via an internal system bus (not shown for sake of brevity), or may not need to occur at all). The session authentication system 102 is configured to then generate a number based on the second set of bits (e.g., using all of the bits in the second set of bits without discarding any of the bits in the second set of bits). In some embodiments, the second set of bits may comprise an entirety of the generated number. But in other embodiments, the second set of bits may comprise a plurality of wildcard bits comprising one or more error bits, and the generated number may comprise a binary number comprising the one or more error bits but not all of the other bits in the second set of bits (e.g., the error bits are not discarded but one or more "correctly" decoded bits are discarded). In some embodiments, either (i) the first quantum basis is not transmitted by the qubit encoder 114 or (ii) the second quantum basis is not transmitted by the qubit decoder 116. In some embodiments, the generated number cannot be reproduced without the first quantum basis, the first set of bits, and the second quantum basis. But even with all of this information, the generated number cannot reliably be recreated due to the randomization introduced by the quantum effect triggered from use of divergent sets of quantum bases during encoding and decoding of the set of qubits. In some embodiments, the qubit decoder 116 may be configured to transmit electronic information indicative of the second set of quantum bases to the qubit encoder 114, the session authentication system 102, or both. In some embodiments, the qubit decoder 116 may be configured to not transmit any electronic information indicative of any of the second set of quantum bases to any other device.

In some embodiments, the session authentication system 102 may be configured to generate a session key based on the generated number. In some embodiments, the session authentication system 102 may be configured to generate a seed for pseudo-random number generation based on the generated number, and generate a pseudo-random number based on the seed, wherein generation of the session key is based on the pseudo-random number. In some instances, the generated number is the session key. The session authentication system 102 may use the generated session key to authenticate a session between a client device 110 and another device.

As a foundation for some embodiments, the central management device 112 may be configured to determine a first set of quantum bases, generate a first control signal indicative of the first set of quantum bases, and transmit the first control signal over one or more communications networks 108 to qubit encoder 114. In some embodiments, the central management device 112 may be configured to determine a second set of quantum bases, generate a second control signal indicative of the second set of quantum bases, and transmit the second control signal over one or more communications networks 108 to qubit decoder 116. In some embodiments, the central management device 112 may be configured to generate a third control signal indicative of an instruction to encode a set of bits and transmit the third control signal over one or more communications networks 108 to qubit encoder 114. In some embodiments, the qubit encoder 114 may be configured to receive the first control signal and the third control signal over one or more communications networks 108. In response to receipt of the third control signal, the qubit encoder 114 may be configured to encode the set of bits based on the first set of quantum bases to generate a set of qubits. In some embodiments, the qubit encoder 114 may be configured to transmit the set of qubits over quantum line 118 to qubit decoder 116. In some embodiments, the qubit decoder 116 may be configured to receive the second control signal over one or more communications networks 108. In some embodiments, the qubit decoder 116 may be configured to receive the set of qubits over the quantum line 118 and decode the set of qubits based on the second set of quantum bases to generate a decoded set of bits. In some embodiments, the qubit decoder 116 may be configured to transmit the decoded set of bits to the session authentication system server device 104 over one or more communications networks 108. The session authentication system server device 104 may be configured to receive the decoded set of bits over one or more communications networks 108, generate a session key based on the decoded set of bits (e.g., by generating a random number based on the decoded set of bits), and transmit the session key over one or more communications networks 108 to client device 110 for use in session authentication.

As a foundation for some embodiments, the qubit encoder 114 may provide for determining, selecting, choosing, or identifying the first quantum basis for encoding bits. In one illustrative embodiment, the qubit decoder 116 may transmit electronic information indicative of the second quantum basis or set of quantum bases to the qubit encoder 114, and the qubit encoder 114 may receive the electronic information from the qubit decoder 116 and determine the first quantum basis or set of quantum bases (e.g., a quantum basis different than the second quantum basis; a quantum basis different than at least one of the second quantum bases if more than one quantum bases are used for decoding qubits; or a set of quantum bases that includes at least one quantum basis that is not used for decoding qubits) based on the received electronic information. In another illustrative embodiment, the qubit decoder 116 may transmit electronic information indicative of the second quantum basis or set of quantum bases to the central management device 112, the central management device 112 may receive the electronic information from the qubit decoder 116 and transmit the received electronic information to the qubit encoder 114, and the qubit encoder 114 may receive the electronic information from the central management device 112 and determine the first quantum basis or set of quantum bases based on the received electronic information. For example, the qubit decoder 116 may transmit electronic information indicative that it is decoding qubits based on one quantum basis (e.g., the rectilinear basis; the diagonal basis; or the circular basis). The qubit encoder 114 may receive (e.g., directly from the qubit decoder 116 or indirectly via the session authentication system 102) that electronic information and determine to encode bits based on a quantum basis different than the quantum basis used by the qubit decoder 116 for decoding qubits. In another example, the qubit decoder 116 may transmit electronic information indicative that it is decoding qubits based on two quantum bases (e.g., the rectilinear and diagonal bases; the rectilinear and circular bases; or the diagonal and circular bases). The qubit encoder 114 may receive that electronic information and determine to encode bits based on only one of those two quantum bases used by the qubit decoder 116 for decoding qubits or based on another quantum basis different than those two quantum bases. In yet another example, the qubit decoder 116 may transmit electronic information indicative that it is decoding qubits based on three quantum bases (e.g., the rectilinear, diagonal, and circular bases), and the qubit encoder 114 may receive that electronic information and determine to encode bits based on one or two of those three quantum bases used by the qubit decoder 116 for decoding qubits.

As a foundation for some embodiments, the central management device 112 may provide for generating a first control signal indicative of an instruction to encode bits based on a first quantum basis or set of quantum bases that has been selected, chosen, determined, or identified by the central management device 112. In one illustrative embodiment, the qubit decoder 116 may transmit electronic information indicative of the second quantum basis or bases to the central management device 112, which in turn may generate a first control signal indicative of an instruction to encode bits based on the first quantum basis or set of quantum bases (e.g., a quantum basis different than the second quantum basis; a quantum basis different than at least one of the second quantum bases if more than one quantum bases are used for decoding qubits; or a set of quantum bases that includes at least one quantum basis that is not used for decoding qubits), and transmit that first control signal to qubit encoder 114, which may encode bits based on the first quantum basis or bases indicated by the first control signal. For example, the qubit decoder 116 may transmit electronic information indicative that it is decoding qubits based on one quantum basis (e.g., the rectilinear basis; the diagonal basis; or the circular basis) to the central management device 112. The central management device 112 may receive that electronic information and generate a first control signal indicative of an instruction to encode bits based on a quantum basis different than the quantum basis used by the qubit decoder 116 for decoding qubits, and transmit that first control signal to the qubit encoder 114, which may encode bits based on the first quantum basis indicated by the first control signal. In another example, the qubit decoder 116 may transmit electronic information indicative that it is decoding qubits based on two quantum bases (e.g., the rectilinear and diagonal bases; the rectilinear and circular bases; or the diagonal and circular bases) to the central management device 112. The central management device 112 may receive that electronic information and generate a first control signal indicative of an instruction to encode bits based on one of those two quantum bases used by the qubit decoder 116 for decoding qubits or a quantum basis different than those two quantum bases, and transmit that first control signal to the qubit encoder 114, which may encode bits based on the first quantum basis indicated by the first control signal. In yet another example, the qubit decoder 116 may transmit electronic information indicative that it is decoding qubits based on three quantum bases (e.g., the rectilinear, diagonal, and circular bases) to the central management device 112. The central management device 112 may receive that electronic information and generate a first control signal indicative of an instruction to encode bits based on one or two of those three quantum bases used by the qubit decoder 116 for decoding qubits, and transmit that first control signal to the qubit encoder 114, which may encode bits based on the first quantum basis indicated by the first control signal.

As illustrated by the above embodiments and examples, the qubit encoder 114 may thus determine the first quantum basis based on knowledge of the second quantum basis. As further illustrated by the above examples, the central management device 112 may generate, based on knowledge of the second quantum basis, a first control signal indicative of a first quantum basis (or, in some instances, an instruction to encode bits based on a first quantum basis) and transmit the first quantum basis to the qubit encoder 114 such that the qubit encoder 114 itself has no knowledge of the second quantum basis. In one illustrative example, the qubit decoder 116 may decode qubits using only the rectilinear basis, and the qubit encoder 114 may encode bits using only: the diagonal basis; the circular basis; the rectilinear and diagonal bases; the rectilinear and circular bases; the diagonal and circular bases; or the rectilinear, diagonal and circular bases. In another illustrative example, the qubit decoder 116 may decode qubits using only the diagonal basis, and the qubit encoder 114 may encode bits using only: the rectilinear basis; the circular basis; the rectilinear and diagonal bases; the rectilinear and circular bases; the diagonal and circular bases; or the rectilinear, diagonal and circular bases. In yet another illustrative example, the qubit decoder 116 may decode qubits using only the circular basis, and the qubit encoder 114 may encode bits using only: the rectilinear basis; the diagonal basis; the rectilinear and diagonal bases; the rectilinear and circular bases; the diagonal and circular bases; or the rectilinear, diagonal and circular bases. In yet another illustrative example, the qubit decoder 116 may decode qubits using only the rectilinear and diagonal bases, and the qubit encoder 114 may encode bits using only: the rectilinear basis; the diagonal basis; the circular basis; the rectilinear and circular bases; the diagonal and circular bases; or the rectilinear, diagonal and circular bases. In yet another illustrative example, the qubit decoder 116 may decode qubits using only the rectilinear and circular bases, and the qubit encoder 114 may encode bits using only: the rectilinear basis; the diagonal basis; the circular basis; the rectilinear and diagonal bases; the diagonal and circular bases; or the rectilinear, diagonal and circular bases. In yet another illustrative example, the qubit decoder 116 may decode qubits using only the diagonal and circular bases, and the qubit encoder 114 may encode bits using only: the rectilinear basis; the diagonal basis; the circular basis; the rectilinear and diagonal bases; the rectilinear and circular bases; or the rectilinear, diagonal and circular bases. In yet another illustrative example, the qubit decoder 116 may decode qubits using only the rectilinear, diagonal, and circular bases, and the qubit encoder 114 may encode bits using only: the rectilinear basis; the diagonal basis; the circular basis; the rectilinear and diagonal bases; the rectilinear and circular bases; or the diagonal and circular bases.

As a foundation for some embodiments, the qubit decoder 116 may provide for determining, selecting, choosing, or identifying the second quantum basis for decoding qubits. In one illustrative embodiment, the qubit encoder 114 may transmit electronic information indicative of the first quantum basis or set of quantum bases to the qubit decoder 116, and the qubit decoder 116 may receive the electronic information from the qubit encoder 114 and determine the second quantum basis or set of quantum bases (e.g., a quantum basis different than the first quantum basis; a quantum basis different than at least one of the first quantum bases if more than one quantum bases are used for encoding bits; or a set of quantum bases that includes at least one quantum basis that is not used for encoding bits) based on the received electronic information. In another illustrative embodiment, the qubit encoder 114 may transmit electronic information indicative of the first quantum basis or bases to the central management device 112. In turn, the central management device 112 may receive the electronic information and transmit the received electronic information to the qubit decoder 116, and the qubit decoder 116 may receive the electronic information from the central management device 112 and determine the second quantum basis or bases based on the received electronic information. For example, the qubit encoder 114 may transmit electronic information indicative that it is encoding bits based on one quantum basis (e.g., the rectilinear basis; the diagonal basis; or the circular basis). The qubit decoder 116 may receive (e.g., directly from the qubit encoder 114 or indirectly via the central management device 112) that electronic information and determine to decode qubits received from the qubit encoder 114 based on a quantum basis different than the quantum basis used by the qubit encoder 114 for encoding qubits. In another example, the qubit encoder 114 may transmit electronic information indicative that it is encoding bits based on two quantum bases (e.g., the rectilinear and diagonal bases; the rectilinear and circular bases; or the diagonal and circular bases). The qubit decoder 116 may receive that electronic information and determine to decode qubits received from the qubit encoder 114 based on one of those two quantum bases used by the qubit encoder 114 for encoding bits or another quantum basis different than those two quantum bases. In yet another example, the qubit encoder 114 may transmit electronic information indicative that it is encoding bits based on three quantum bases (e.g., the rectilinear, diagonal, and circular bases), and the qubit decoder 116 may receive that electronic information and determine to decode qubits received from the qubit encoder 114 based on one or two of those three quantum bases used by the qubit encoder 114 for encoding bits.

As a foundation for some embodiments, the central management device 112 may provide for generating a second control signal indicative of an instruction to decode qubits based on a second quantum basis that has been selected, chosen, determined, or identified by the central management device 112. In one illustrative embodiment, the qubit encoder 114 may transmit electronic information indicative of the first quantum basis or bases to the central management device 112. The central management device 112 may receive the electronic information, generate a second control signal indicative of an instruction to decode qubits based on the second quantum basis or set of quantum bases (e.g., a quantum basis different than the first quantum basis; a quantum basis different than at least one of the first quantum bases if more than one quantum bases are used for encoding bits; or a set of quantum bases that includes at least one quantum basis that is not used for encoding bits), and transmit the generated second control signal to qubit decoder 116, which may decode qubits based on the second quantum basis or bases indicated by the second control signal. For example, the qubit encoder 114 may transmit electronic information indicative that it is encoding bits based on one quantum basis (e.g., the rectilinear basis; the diagonal basis; or the circular basis) to the central management device 112. The central management device 112 may receive that electronic information, generate a second control signal indicative of an instruction to decode qubits based on a quantum basis different than the quantum basis used by the qubit encoder 114 for encoding bits, and transmit that second control signal to the qubit decoder 116, which may decode qubits received from the qubit encoder 114 based on the second quantum basis indicated by the second control signal. In another example, the qubit encoder 114 may transmit electronic information indicative that it is encoding bits based on two quantum bases (e.g., the rectilinear and diagonal bases; the rectilinear and circular bases; or the diagonal and circular bases) to the central management device 112. The central management device 112 may receive that electronic information, generate a second control signal indicative of an instruction to decode qubits based on one of those two quantum bases used by the qubit encoder 114 for encoding bits, or a quantum basis different than those two quantum bases, and transmit that second control signal to the qubit decoder 116, which may decode qubits received from the qubit encoder 114 based on the second quantum basis indicated by the second control signal. In yet another example, the qubit encoder 114 may transmit electronic information indicative that it is encoding bits based on three quantum bases (e.g., the rectilinear, diagonal, and circular bases) to the central management device 112. The central management device 112 may receive that electronic information, generate a second control signal indicative of an instruction to decode qubits based on one or two of those three quantum bases used by the qubit encoder 114 for encoding bits, and transmit that second control signal to the qubit decoder 116, which may decode qubits received from the qubit encoder 114 based on the second quantum basis indicated by the second control signal.

Accordingly, as illustrated by the above embodiments and examples, the qubit decoder 116 may determine the second quantum basis based on knowledge of the first quantum basis. As further illustrated by the above embodiments and examples, the central management device 112 may alternatively generate, based on knowledge of the first quantum basis, a second control signal indicative of a second quantum basis (or, in some instances, an instruction to decode qubits based on a second quantum basis) and transmit the second control signal to the qubit decoder 116 such that the qubit decoder 116 has no knowledge of the first quantum basis. In one illustrative example, the qubit encoder 114 may encode bits using only the rectilinear basis, and the qubit decoder 116 may decode qubits using only: the diagonal basis; the circular basis; the rectilinear and diagonal bases; the rectilinear and circular bases; the diagonal and circular bases; or the rectilinear, diagonal and circular bases. In another illustrative example, the qubit encoder 114 may encode bits using only the diagonal basis, and the qubit decoder 116 may decode qubits using only: the rectilinear basis; the circular basis; the rectilinear and diagonal bases; the rectilinear and circular bases; the diagonal and circular bases; or the rectilinear, diagonal and circular bases. In yet another illustrative example, the qubit encoder 114 may encode bits using only the circular basis, and the qubit decoder 116 may decode qubits using only: the rectilinear basis; the diagonal basis; the rectilinear and diagonal bases; the rectilinear and circular bases; the diagonal and circular bases; or the rectilinear, diagonal and circular bases. In yet another illustrative example, the qubit encoder 114 may encode bits using only the rectilinear and diagonal bases, and the qubit decoder 116 may decode qubits using only: the rectilinear basis; the diagonal basis; the circular basis; the rectilinear and circular bases; the diagonal and circular bases; or the rectilinear, diagonal and circular bases. In yet another illustrative example, the qubit encoder 114 may encode bits using only the rectilinear and circular bases, and the qubit decoder 116 may decode qubits using only: the rectilinear basis; the diagonal basis; the circular basis; the rectilinear and diagonal bases; the diagonal and circular bases; or the rectilinear, diagonal and circular bases. In yet another illustrative example, the qubit encoder 114 may encode bits using only the diagonal and circular bases, and the qubit encoder 114 may decode qubits using only: the rectilinear basis; the diagonal basis; the circular basis; the rectilinear and diagonal bases; the rectilinear and circular bases; or the rectilinear, diagonal and circular bases. In yet another illustrative example, the qubit encoder 114 may encode bits using only the rectilinear, diagonal, and circular bases, and the qubit decoder 116 may decode qubits using only: the rectilinear basis; the diagonal basis; the circular basis; the rectilinear and diagonal bases; the rectilinear and circular bases; or the diagonal and circular bases.

In some embodiments, the central management device 112 may be configured to generate a time-dependent quantum encoding schedule comprising a first plurality of quantum bases respectively corresponding to a first plurality of time periods. The central management device 112 may be configured to transmit the time-dependent quantum encoding schedule to the qubit encoder 114. The qubit encoder 114 may be configured to receive the time-dependent quantum encoding schedule and encode bits based on the time-dependent quantum encoding schedule. For example, an example time-dependent quantum encoding schedule may comprise electronic information indicative of instructions to encode bits based on a rectilinear basis during a first time period (e.g., a first 10 nanoseconds), a diagonal basis during a second time period (e.g., the next 20 nanoseconds), a rectilinear basis during a third time period (e.g., the next 50 nanoseconds), and a circular basis during a fourth time period (e.g., the next 20 nanoseconds), after which the time-dependent quantum encoding schedule may repeat.

In some embodiments, the central management device 112 may be configured to generate a time-dependent quantum decoding schedule comprising a second plurality of quantum bases respectively corresponding to a second plurality of time periods. The central management device 112 may be configured to transmit the time-dependent quantum decoding schedule to the qubit decoder 116. The qubit decoder 116 may be configured to receive the time-dependent quantum decoding schedule and decode bits based on the time-dependent quantum decoding schedule. For example, an example time-dependent quantum decoding schedule may comprise electronic information indicative of instructions to decode qubits based on a diagonal basis during a first time period (e.g., a first 5 nanoseconds), a rectilinear basis during a second time period (e.g., the next 30 nanoseconds), and a circular basis during a third time period (e.g., the next 10 nanoseconds), after which the time-dependent quantum decoding schedule may repeat.

It will be appreciated that other patterns of quantum basis selection may be utilized as well. For instance, the central management device 112 may be configured to generate a unit-dependent quantum encoding schedule, a unit-dependent quantum decoding schedule, or both. The central management device 112 may be configured to transmit the unit-dependent quantum encoding schedule to the qubit encoder 114. The qubit encoder 114 may be configured to receive the unit-dependent quantum encoding schedule and encode bits to generate qubits based on the unit-dependent quantum encoding schedule. The central management device 112 may be further configured to transmit the unit-dependent quantum decoding schedule to the qubit decoder 116. The qubit decoder 116 may be configured to receive the unit-dependent quantum decoding schedule and decode qubits to generate bits based on the unit-dependent quantum decoding schedule. For example, an example unit-dependent quantum encoding schedule may comprise electronic information indicative of instructions to encode qubits based on a rectilinear basis for a first number of bits (e.g., a first 2 bits), a diagonal basis for a second number of bits (e.g., the next 5 bits), a rectilinear basis for a third number of bits (e.g., the next 3 bits), and a circular basis during for a fourth number of bits (e.g., the next 2 bits), after which the unit-dependent quantum encoding schedule may repeat. As another example, an example unit-dependent quantum decoding schedule may comprise electronic information indicative of instructions to decode qubits based on a diagonal basis for a first number of bits (e.g., a first 2 bits), a rectilinear basis for a second number of bits (e.g., the next 4 bits), and a circular basis during for a third number of bits (e.g., the next 2 bits), after which the unit-dependent quantum decoding schedule may repeat. Other encoding and decoding patterns may be utilized as well without departing from the scope of the present disclosure.

It will further be appreciated that the quantum basis or set of quantum bases used by the qubit encoder 114 may be determined (by, for instance, either the qubit encoder 114 or the central management device 112) without reliance on the quantum basis or set of quantum bases used by the qubit decoder 116. Similarly, the quantum basis or set of quantum bases used by the qubit decoder 116 may be determined (by, for instance, either the qubit encoder 114 or the central management device 112) without reliance on the quantum basis or set of quantum bases used by the qubit encoder 114. One example where the determination of a quantum basis or set of quantum bases is performed without reliance on another quantum basis or set of quantum bases is when the quantum basis or set of quantum bases used by the qubit encoder 114 or qubit decoder 116 is determined without knowledge of the quantum basis or set of quantum bases used by the other of the qubit encoder 114 or the qubit decoder 116. After all, determination of a first quantum basis or set of quantum bases without knowledge of a second quantum basis or set of quantum bases necessarily means that the determination of the first quantum basis or set of quantum bases occurs without reliance on the second quantum basis or set of quantum bases.

However, lack of knowledge is not the only situation in which there can be non-reliance. Another situation in which there can be non-reliance is where the entity (e.g., the qubit encoder 114, the central management device 112, qubit decoder 116, or session authentication system 102) performing the determination of a first quantum basis or set of quantum bases has knowledge of a second quantum basis or set of quantum bases, but that knowledge is not used by the entity in the determination of the first quantum basis or set of quantum bases. For example, the quantum basis or set of quantum bases to be used by the qubit encoder 114 may be determined without reference to the corresponding quantum basis or set of quantum bases used by the qubit decoder 116 even though the entity determining the quantum basis or set of quantum bases to be used by the qubit encoder 114 has knowledge of the quantum basis or set of quantum bases used by the qubit decoder 116. Similarly, the quantum basis or set of quantum bases to be used by the qubit decoder 116 may be determined without reference to the corresponding quantum basis or set of quantum bases used by the qubit encoder 114 even though the entity determining the quantum basis or set of quantum to be used by the qubit decoder 116 may have knowledge of the quantum basis or set of quantum bases used by the qubit encoder 114.

In some embodiments, there may be mutual non-reliance, such that the quantum basis or set of quantum bases used by the qubit encoder 114 is determined without reliance on the quantum basis or set of quantum bases used by the qubit decoder 116 and the quantum basis or set of quantum bases used by the qubit decoder 116 is also determined without reliance on the quantum basis or set of quantum bases used by the qubit encoder 114.

In some embodiments, the central management device 112 may determine a set of quantum bases for use by the qubit encoder 114 using a pseudo-random quantum basis selection technique, and both the central management device 112 and the qubit encoder 114 may never thereafter transmit information about the selected set of quantum bases. In other embodiments, the qubit encoder 114 may itself select a set of quantum bases for use and may utilize that selected set of quantum bases without ever transmitting information about the selected set of quantum bases to any other device. Similarly, the central management device 112 may determine a set of quantum bases for use by the qubit decoder 116 using a pseudo-random quantum basis selection technique, and both the central management device 112 and the qubit decoder 116 may never thereafter transmit information about the selected set of quantum bases.

By way of example, in some embodiments, the selection of an appropriate set of quantum bases may utilize a frequency calculation procedure in which a selection frequency for each quantum basis may be monitored such that the likelihood that an unselected quantum basis is selected during subsequent selections is increased until an unselected quantum basis is selected. Said differently, in an instance in which a first quantum basis is initially selected, the remaining quantum bases may be weighted such that selection of these quantum bases on subsequent selections operations is more likely as compared to the first quantum basis. Once these remaining quantum bases are selected in the future, however, their corresponding weighting may decrease relative to still other unselected quantum bases. To duplicate this pseudo-random quantum basis selection technique, an intruder would need to have insight into multiple different iterations of the pseudo-random number generation process, and even then would need to deduce the weighting scheme. While a frequency calculation procedure is outlined above for selection of a set of quantum bases for the qubit encoder 114 or the qubit decoder 116, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the set of quantum bases for the qubit encoder 114 and/or the qubit decoder 116 without departing from the scope of the disclosure.

Example Implementing Apparatuses

The example environments described with reference to FIGS. 1A-1D may be embodied by one or more computing systems, such as: apparatus 200 shown in FIG. 2A, which represents an example session authentication system 102, a session authentication system server device 104, or both; apparatus 220 shown in FIG. 2B, which represents an example client device 110; apparatus 240 shown in FIG. 2C, which represents an example central management device 112; apparatus 260 shown in FIG. 2D, which represents an example qubit encoder 114; apparatus 270 shown in FIG. 2E, which represents an example switching device 122; and apparatus 280 shown in FIG. 2F, which represents an example qubit decoder 116. As noted previously, it will be appreciated that in some embodiments, one or more of the apparatuses described in connection with FIGS. 2A-2F may be components of another of these apparatuses (as one example, the apparatus 240, representing a central management device 112, may in some embodiments be a component of apparatus 200, which represents an example of the session authentication system 102; as another example, apparatus 260, which represents a qubit encoder 114, may in some embodiments be a component of apparatus 240, which represents the central management device 112; and as yet another example, apparatus 280, which represents a qubit decoder 116, may in some embodiments be a component of apparatus 200, which, as noted above, represents an example session authentication system 102).

Figure 2A:
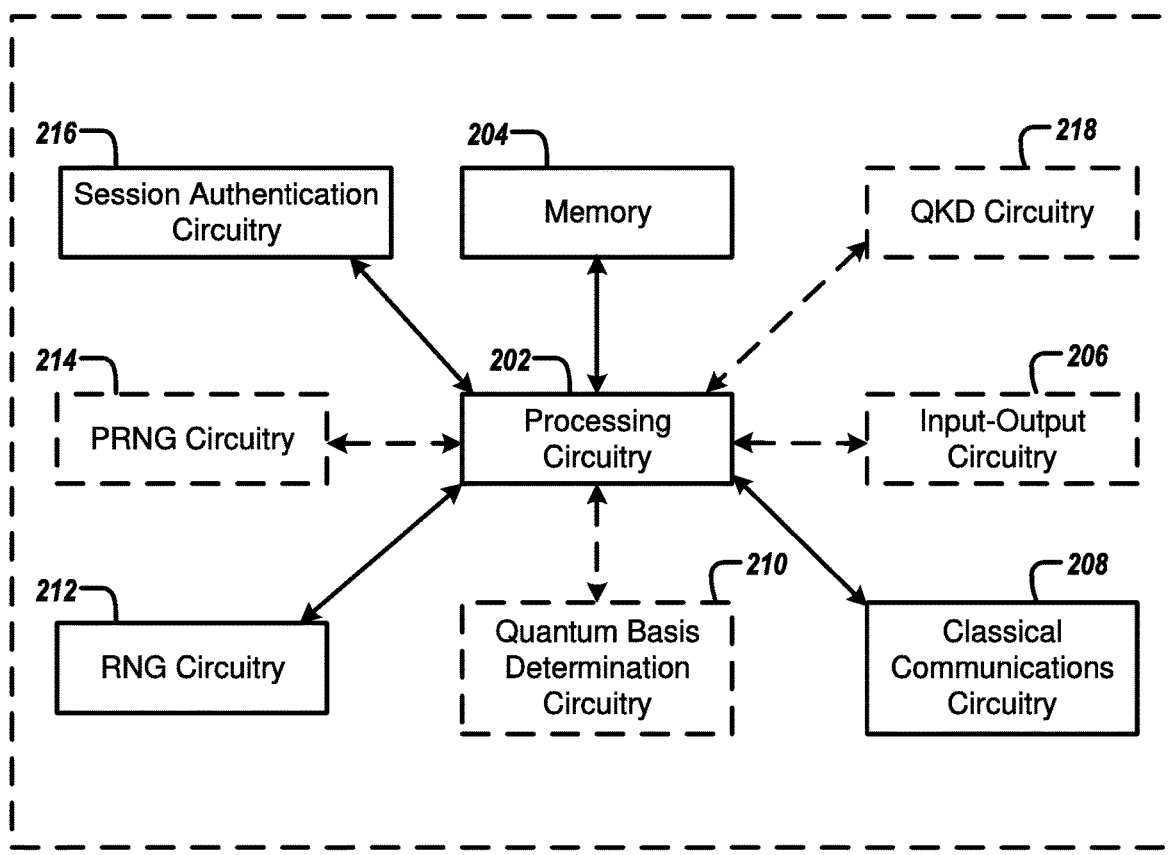
FIGS. 2A, 2B, 2C, 2D, 2E, and 2F illustrate schematic block diagrams of example circuitry that may perform various operations in accordance with some example embodiments described herein.

As illustrated in FIG. 2A, the apparatus 200, representing an example session authentication system 102 (or, in some instances, a session authentication system server device 104 resident within a session authentication system 102), may include processing circuitry 202, memory 204, input-output circuitry 206, classical communications circuitry 208, quantum basis determination circuitry 210, random number generation (RNG) circuitry 212, pseudo-random number generation (PRNG) circuitry 214, session authentication circuitry 216, and quantum key distribution (QKD) circuitry 218. The apparatus 200 may be configured to execute various operations described above with respect to FIGS. 1A-1D and below with respect to FIGS. 3-8.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data, control signals, electronic information, and, in some instances, encoding and decoding schedules. It will be understood that the memory 204 may be configured to store any electronic information, data, control signals, schedules, links, pointers, databases, tables, maps, embodiments, examples, figures, techniques, processes, operations, techniques, methods, systems, apparatuses, or computer program products described herein, or any combination thereof. The memory 204 may, in this regard, host components such as one or more session authentication system databases 106, described with reference to FIGS. 1A-1D.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a set of bits, a control signal (e.g., a control signal indicative of a quantum basis or set of quantum bases; a control signal indicative of an instruction to encode bits or decode qubits according to a particular quantum basis or set of quantum bases), or a schedule (e.g., a time-dependent quantum encoding schedule, time-dependent quantum decoding schedule, a unit-dependent quantum encoding schedule, or a unit-dependent quantum decoding schedule) provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic content for display by one or more other devices with which one or more users directly interact and classical communications circuitry 208 of the apparatus 200 may be leveraged to transmit the generated electronic content to one or more of those devices.

The classical communications circuitry 208 may be any device or circuitry embodied in either hardware or a combination of hardware and software that is configured to receive and/or transmit data from or to a network and/or any other device, circuitry, or module in communication with the apparatus 200. In this regard, the classical communications circuitry 208 may include, for example, a network interface for enabling communications with a wired or wireless communications network. For example, the classical communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum basis determination circuitry 210 includes hardware components designed or configured to determine, select, choose, or identify: a first quantum basis or set of quantum bases for encoding bits; a second quantum basis or set of quantum bases for decoding qubits; or both. In some embodiments, the quantum basis determination circuitry 210 includes hardware components designed or configured to: determine the first set of quantum bases without reliance on the second set of quantum bases; determine the second set of quantum bases without reliance on the first set of quantum bases; or both. It will be understood that the terms "determine," "determining," and "determining," as recited throughout this disclosure, broadly and respectively encompass the terms generate, generating, and generation.

In some embodiments, the quantum basis determination circuitry 210 includes hardware components designed or configured to generate: a first control signal indicative the determined first set of quantum bases (or, in some instances, an instruction to encode bits based on the determined first set of quantum bases); a second control signal indicative the determined second set of quantum bases (or, in some instances, an instruction to decode qubits based on the determined second set of quantum bases); or both. In some embodiments, the quantum basis determination circuitry 210 includes hardware components designed or configured to generate a third control signal indicative of an instruction to encode a set of bits. In some embodiments, the first control signal may comprise one or more links or pointers to the determined first set of quantum bases contained in a database of quantum bases stored in memory (e.g., memory 204). In some embodiments, the second control signal may comprise one or more links or pointers to the determined second set of quantum bases contained in the database of quantum bases.

In some embodiments, the quantum basis determination circuitry 210 includes hardware components designed or configured to generate: a time-dependent quantum encoding schedule comprising a first plurality of quantum bases respectively corresponding to a first plurality of time periods; a time-dependent quantum decoding schedule comprising a second plurality of quantum bases respectively corresponding to a second plurality of time periods; or both. In some embodiments, the quantum basis determination circuitry 210 includes hardware components designed or configured to generate: a unit-dependent quantum encoding schedule comprising a first plurality of quantum bases respectively corresponding to a first plurality of numbers of bits; a unit-dependent quantum decoding schedule comprising a second plurality of quantum bases respectively corresponding to a second plurality of numbers of bits; or both. The set of quantum bases may be determined by the quantum basis determination circuitry 210 using a pseudo-random quantum basis selection technique, as described previously. Subsequently, the quantum basis determination circuitry 210 may never thereafter transmit information about the selected set of quantum bases, except as necessary for instruction of corresponding qubit encoder 114 or qubit decoder 116.

In some embodiments, the quantum basis determination circuitry 210 includes hardware components designed or configured to determine the first set of quantum bases based on electronic information indicative of the second set of quantum bases (e.g., electronic information indicative of the second set of quantum bases received by classical communications circuitry 208 over a communications network from the qubit decoder 116). In some instances, the first set of quantum bases and the second set of quantum bases may be different (e.g., include different quantum bases, different amounts of quantum bases, or both). In some embodiments, the quantum basis determination circuitry 210 includes hardware components designed or configured to determine the second set of quantum bases based on the electronic information indicative of the first set of quantum bases (e.g., electronic information indicative of the first set of quantum bases received by classical communications circuitry 208 over a communications network from the qubit encoder 114). In some instances, the second set of quantum bases and the first set of quantum bases may be different (e.g., include different quantum bases, different amounts of quantum bases, or both).

In some embodiments, the quantum basis determination circuitry 210 includes hardware components designed or configured to generate a time-dependent quantum encoding schedule comprising a first plurality of quantum bases respectively corresponding to a first plurality of time periods. In some instances, the first control signal may comprise the time-dependent quantum encoding schedule, and the first set of quantum bases may comprise the first plurality of quantum bases. In some embodiments, the quantum basis determination circuitry 210 includes hardware components designed or configured to generate a time-dependent quantum decoding schedule comprising a second plurality of quantum bases respectively corresponding to a second plurality of time periods. In some instances, the second control signal may comprise the time-dependent quantum decoding schedule, and the second set of quantum bases may comprise the second plurality of quantum bases. In some embodiments, the encoding circuitry 224 may be configured to encode the set of bits based on the time-dependent quantum encoding schedule to generate the set of qubits. In some embodiments, the decoding circuitry 226 may configured to decode the set of qubits based on the time-dependent quantum decoding schedule to generate the decoded set of bits.

In some embodiments, the quantum basis determination circuitry 210 includes hardware components designed or configured to generate a unit-dependent quantum encoding schedule comprising a first plurality of quantum bases respectively corresponding to a first plurality of numbers of bits. In some instances, the first control signal may comprise the unit-dependent quantum encoding schedule, and the first set of quantum bases may comprise the first plurality of quantum bases. In some embodiments, the quantum basis determination circuitry 210 includes hardware components designed or configured to generate a unit-dependent quantum decoding schedule comprising a second plurality of quantum bases respectively corresponding to a second plurality of numbers of bits. In some instances, the second control signal may comprise the unit-dependent quantum decoding schedule, and the second set of quantum bases may comprise the second plurality of quantum bases. In some embodiments, the encoding circuitry 224 may be configured to encode the set of bits based on the unit-dependent quantum encoding schedule to generate the set of qubits. In some embodiments, the decoding circuitry 226 may configured to decode the set of qubits based on the unit-dependent quantum decoding schedule to generate the decoded set of bits.

In some embodiments, the quantum basis determination circuitry 210 includes hardware components designed or configured to determine the first set of quantum bases using a pseudo-random quantum basis selection technique. In some embodiments, the quantum basis determination circuitry 210 includes hardware components designed or configured to determine the second set of quantum bases using the pseudo-random quantum basis selection technique. In some embodiments, the pseudo-random quantum basis selection technique may comprise a frequency calculation procedure.

In some embodiments, the session authentication system 102 may comprise multiple quantum basis determination circuitries 210, such as: one embodied by central management device 112; one embodied by each qubit encoder 114A-114N; one embodied by each qubit decoder 116A-116N; one that controls quantum basis determination for qubit encoder 114 and another that controls quantum basis determination for qubit decoders 116A-116N; or multiple quantum basis determination circuitries corresponding to any other suitable arrangement.

The hardware components comprising the quantum basis determination circuitry 210 may, for instance, utilize processing circuitry 202 to perform various computing operations and may utilize memory 204 for storage of data or electronic information received or generated by the quantum basis determination circuitry 210. The hardware components may further utilize classical communications circuitry 208 or any other suitable wired or wireless communications path to communicate with a central management device 112, a qubit encoder 114, a qubit decoder 116, or any other suitable circuitry or device described herein.

The RNG circuitry 212 includes hardware components designed or configured to generate a number based on a second set of bits generated by a qubit decoder 116. For example, the generated number may be an actual second set of bits generated by the qubit decoder 116, a number that includes the second set of bits in its entirety, a number that includes only "error" bits for which a quantum basis used for encoding of a qubit differs from a quantum basis used for decoding of the qubit, or any other suitable number. These hardware components may, for instance, utilize processing circuitry 202 to perform various computing operations and may utilize memory 204 for storage of data or electronic information received or generated by the RNG circuitry 212. The hardware components may further utilize classical communications circuitry 208, or any other suitable wired or wireless communications path to communicate with a qubit decoder 116 or any other suitable circuitry or device described herein.

The PRNG circuitry 214 includes hardware components designed or configured to receive a seed for pseudo-random number generation based on the number generated by the RNG circuitry 212 and then generate a pseudo-random number based on the seed. These hardware components may, for instance, utilize processing circuitry 202 to perform various computing operations and may utilize memory 204 for storage of data or electronic information received or generated by the PRNG circuitry 214.

The session authentication circuitry 216 includes hardware components designed or configured to generate a session ID (e.g., a session key) based on a number generated by the RNG circuitry 212, a pseudo-random number generated by the PRNG circuitry 214, or both. For example, the session authentication circuitry 216 may receive the pseudo-random number from the PRNG circuitry 214 and use the received pseudo-random number as the session key. In another example, the session authentication circuitry 216 may receive the generated number from the RNG circuitry 212 and use the generated number as the session key. In yet another example, the session authentication circuitry 216 may perform a further transformation on a number generated by the RNG circuitry 212 or a pseudo-random number generated by the PRNG circuitry 214 (e.g., a convolution of the number or pseudo-random number with an independent variable, such as an internal clock time measured by the apparatus 200), and thereafter use the result of the further transformation as the session key. In some embodiments, the session authentication circuitry 216 may be further configured to generate the session key by (i) setting the session key equal to a generated number (e.g., a number generated by the RNG circuitry 214 or the PRNG circuitry 216 based on the decoded set of bits), or (ii) using the generated number as a seed in a pseudo-random number generation procedure, wherein an output of the pseudo-random number generation procedure comprises the session key. Following generation of the session key, the session authentication circuitry 216 may transmit the session key to a client device 110 (and in one such embodiment, the session authentication circuitry 216 may cause QKD circuitry 218 to perform quantum key distribution of the session key to securely transmit the session key).

In some embodiments, the session authentication circuitry 216 includes hardware components designed or configured to subsequently authenticate a session between two or more devices. In some instances, the session authentication circuitry 216 may use the generated session key to authenticate a session on behalf of a server device (e.g., a session authentication system server device 104) and at the request of a client device 110. For example, the session authentication circuitry 216 may use a generated first session key to authenticate a first session on behalf of a session authentication system server device 104A and at the request of one of client devices 110A-110N. In another example, the session authentication circuitry 216 may use a generated second session key to authenticate a second session between two other devices, such as session authentication system server device 104B and at the request of another of the client devices 110A-110N. In some instances, the session authentication circuitry 216 may receive a key from the client device 110, and then compare the received key to the generated session key to determine if a match is found. If so, the session authentication circuitry 216 may transmit a communication to the server device comprising a validation of the session key received from the client device 110. If not, then the session authentication circuitry 216 may transmit a communication to the server device indicating a validation failure. The hardware components comprising the session authentication circuitry 216 may, for instance, utilize processing circuitry 202 to perform various computing operations and may utilize memory 204 for storage of data or electronic information received or generated by the session authentication circuitry 216. The hardware components may further utilize classical communications circuitry 208, or any other suitable wired or wireless communications path to communicate with a remote server device or a client device 110, or any other suitable circuitry or device described herein.

The QKD circuitry 218 includes hardware components designed or configured to perform quantum key distribution of a session key generated by the session authentication circuitry 216. These hardware components may, for instance, utilize processing circuitry 202 to perform various computing operations and may utilize memory 204 for storage of data or electronic information received or generated by the QKD circuitry 218. The hardware components may further utilize classical communications circuitry 208, or any other suitable wired or wireless communications path to communicate with a client device 110 to distribute a session ID to the client device 110, or with any other suitable circuitry or device described herein.

Figure 2B:
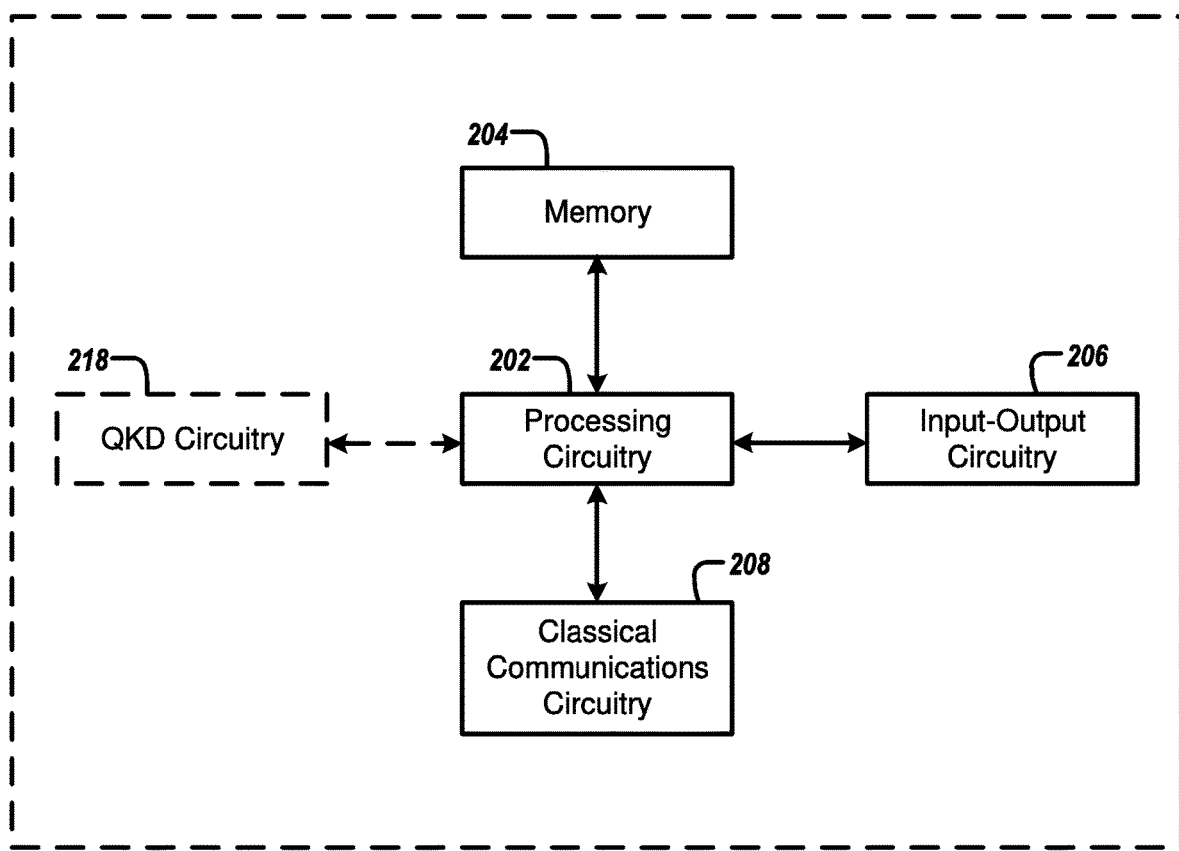

As illustrated in FIG. 2B, an apparatus 220 is shown that represents an example client device 110. The apparatus 220 includes processing circuitry 202, memory 204, input-output circuitry 206, and classical communications circuitry 208, and may optionally include QKD circuitry 218, as described above in connection with FIG. 2A. It will be appreciated that QKD circuitry 218 is an optional component of the apparatus 220 insofar as it is only required if a session ID (e.g., session key) is distributed from the session authentication system 102 to the client device 110 via a QKD procedure (other key distribution techniques may alternatively be used). It will be understood, however, that additional components providing additional functionality may be included in the apparatus 220 without departing from the scope of the present disclosure. The apparatus 220 may be involved in execution of various operations described above with respect to FIGS. 1A-1D and below with respect to FIGS. 3-8.

Figure 2C:
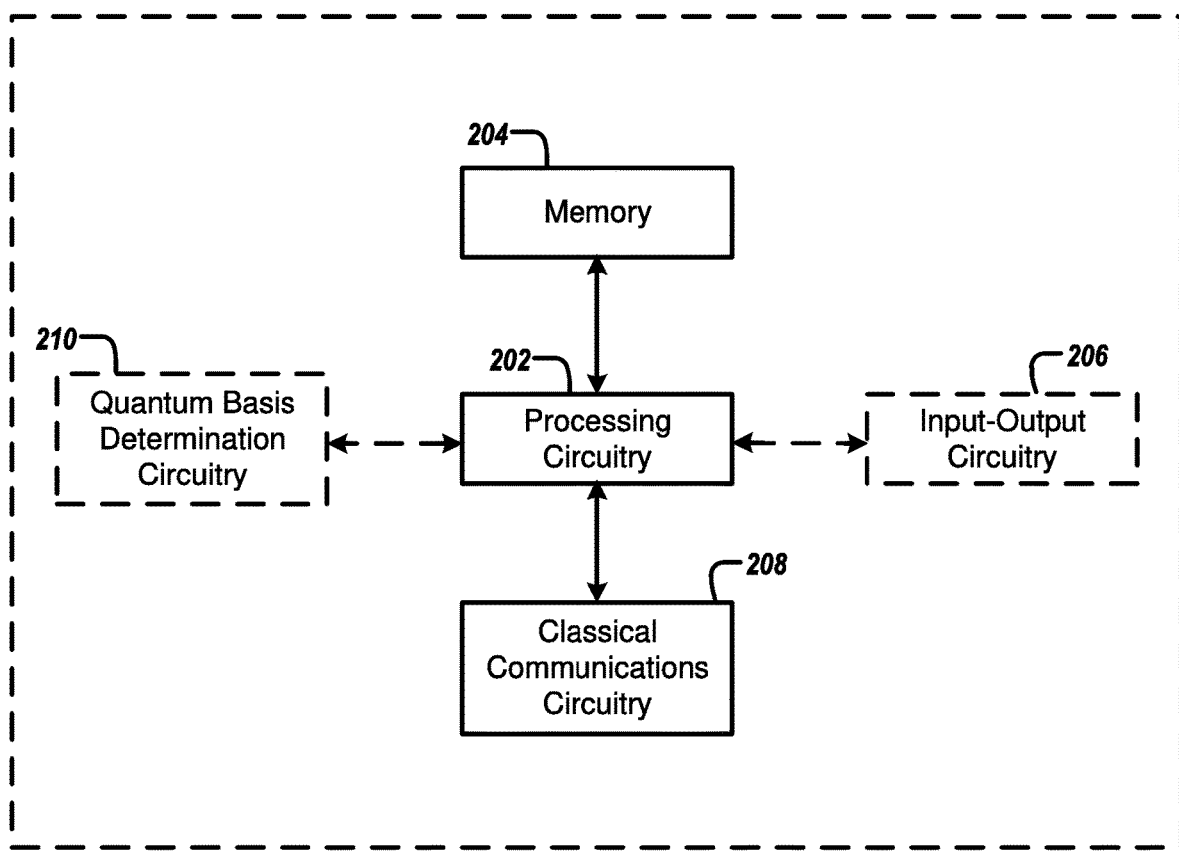

As illustrated in FIG. 2C, an apparatus 240 is shown that represents an example central management device 112. The apparatus 240 includes processing circuitry 202, memory 204, and classical communications circuitry 208, and may optionally include input-output circuitry 206, as described above in connection with FIG. 2A. Input-output circuitry 206 is optional in apparatus 240 insofar as it is only required in embodiments where a user directly interacts with the apparatus 240 to provide information needed for quantum basis determination for a qubit encoder 114 communicatively connected to the central management device 112. To this end, the apparatus 240 may also include quantum basis determination circuitry 210, as described above in connection with FIG. 2A, for the purpose of selecting an appropriate quantum basis for the qubit encoder 114.

The apparatus 240 may be configured to execute various operations described above with respect to FIGS. 1A-1D and below with respect to FIGS. 3-8. It will be understood, however, that additional components providing additional functionality may be included in the apparatus 240 without departing from the scope of the present disclosure. Moreover, as noted previously, in some embodiments the central management device 112 comprises a component of session authentication system 102, and in such embodiments, the components described herein in connection with apparatus 240 shall be understood as comprising components of an apparatus 200 representing a corresponding session authentication system 102 (or a constituent session authentication system server device 104 thereof).

Figure 2D:
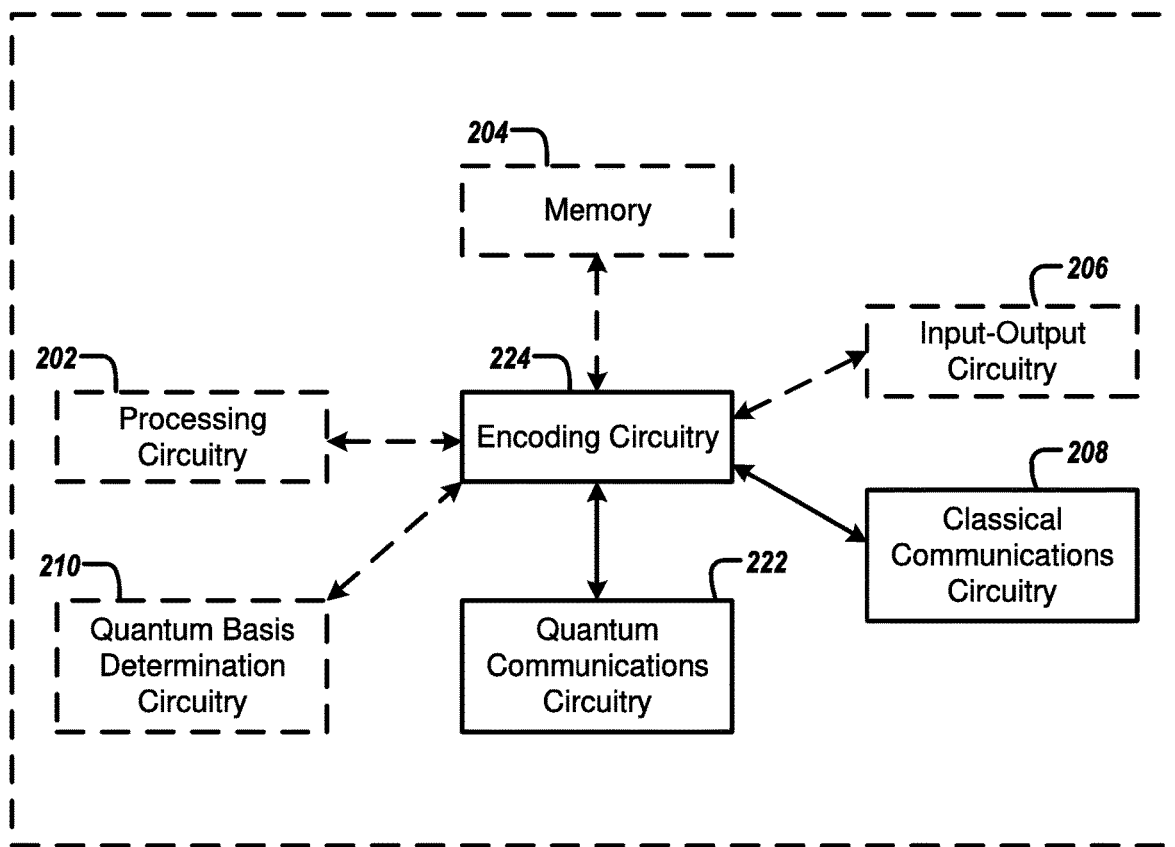

As illustrated in FIG. 2D, an apparatus 260 is shown that represents an example qubit encoder 114. The apparatus 260 includes classical communications circuitry 208, as described above in connection with FIG. 2A. The apparatus 260 additionally includes quantum communications circuitry 222 to transmit a set of qubits to a qubit decoder, and encoding circuitry 224 to generate the set of qubits to be transmitted. In addition, the apparatus 260 may further include processing circuitry 202 and a memory 204 to facilitate operation of encoding circuitry 224, and may include quantum basis determination circuitry 210 in some embodiments where the quantum basis, or set of quantum bases, selected for encoding of a given set of bits is determined by the apparatus 260 and not by a separate central management device 112 or session authentication system 102.

The quantum communications circuitry 222 may be any device or circuitry embodied in either hardware or a combination of hardware and software that is configured to receive and/or transmit qubits from or to any other device, circuitry, or module in communication with the apparatus 260. In this regard, the quantum communications circuitry 222 may include, for example, a quantum communications interface for enabling quantum communications over a quantum line (e.g., quantum line 118 shown in FIGS. 1A-1D).

The encoding circuitry 224 includes hardware components designed or configured to generate a set of qubits by encoding a first set of bits based on a first set of quantum bases. The encoding circuitry 224 may comprise various optoelectronic components, such as those described previously. In some embodiments, the encoding circuitry 224 may include additional hardware components designed or configured to encode bits based on a time-dependent quantum encoding schedule comprising a first plurality of quantum bases respectively corresponding to a first plurality of time periods. Similarly, the encoding circuitry 224 may include additional hardware components designed or configured to encode bits based on a unit-dependent quantum encoding schedule comprising a first plurality of quantum bases respectively corresponding to a first plurality of numbers of bits to be encoded. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., a central management device 112 or session authentication system server device 104), or any other suitable circuitry or device described herein.

The apparatus 260 may be configured to execute various operations described above with respect to FIGS. 1A-1D and below with respect to FIGS. 3-8. It will be understood, however, that additional components providing additional functionality may be included in the apparatus 260 without departing from the scope of the present disclosure. Moreover, as noted previously, in some embodiments the qubit encoder 114 comprises a component of a central management device 112, and in such embodiments, the components described herein in connection with apparatus 260 shall be understood as comprising components of an apparatus 240 representing a corresponding central management device 112 (or, by extension, of a session authentication system 102 (or a constituent session authentication system server device 104 thereof) in embodiments in which the central management device 112 itself comprises a component of one of those devices).

Figure 2E:
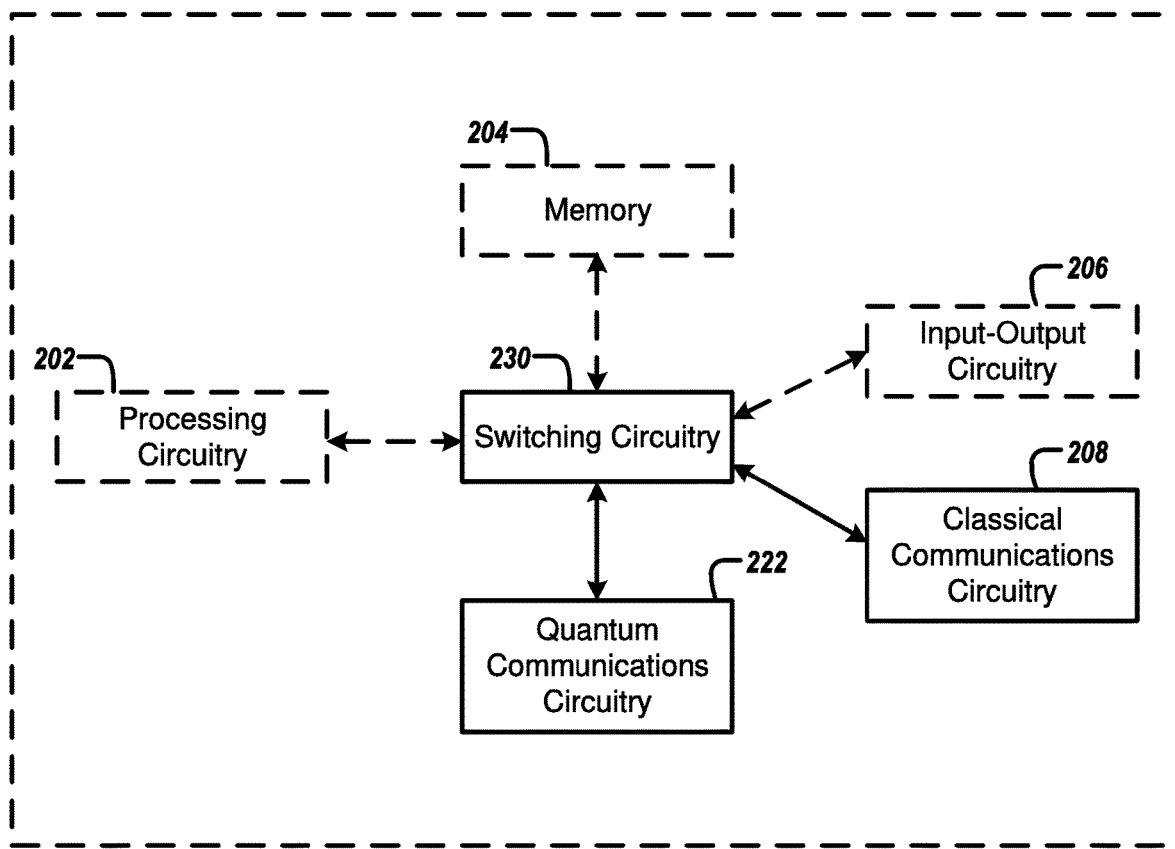

As illustrated in FIG. 2E, an apparatus 270 is shown that represents an example switching device 122. The apparatus 270 includes classical communications circuitry 208, as described above in connection with FIG. 2A. The apparatus 260 additionally includes quantum communications circuitry 222 to receive sets of qubits from a qubit encoder (or, in some instances, from another switching device) and to transmit sets or subsets of qubits to qubit decoders (or, in some instances, to another switching device). The apparatus 260 additionally includes switching circuitry 230 to perform the switching operations described herein. In addition, the apparatus 270 may further include processing circuitry 202 and a memory 204 to facilitate operation of switching circuitry 230.

The switching circuitry 230 includes hardware components designed or configured to transmit qubits received from the encoding circuitry 224 (e.g., a qubit encoder 114), or from another switching circuitry (e.g., one or more additional switching devices 122), to one or more decoding circuitries 226 (e.g., one or more of qubit decoders 116A-116N). For example, the switching circuitry 230 may transmit a first subset of qubits received from the encoding circuitry 224 to a first decoding circuitry 226 (e.g., qubit decoder 116A). In another example, the switching circuitry 230 may transmit the second subset of qubits received from the encoding circuitry 224 to a second decoding circuitry 226 (e.g., qubit decoder 116B). These hardware components may utilize quantum communications circuitry 222 to communicate with the encoding circuitry 224 (e.g., a qubit encoder 114), another switching circuitry (e.g., one or more additional switching devices 122), decoding circuitry 226 (e.g., one or more of qubit decoders 116A-116N), or any other suitable circuitry or device described herein.

Figure 2F:
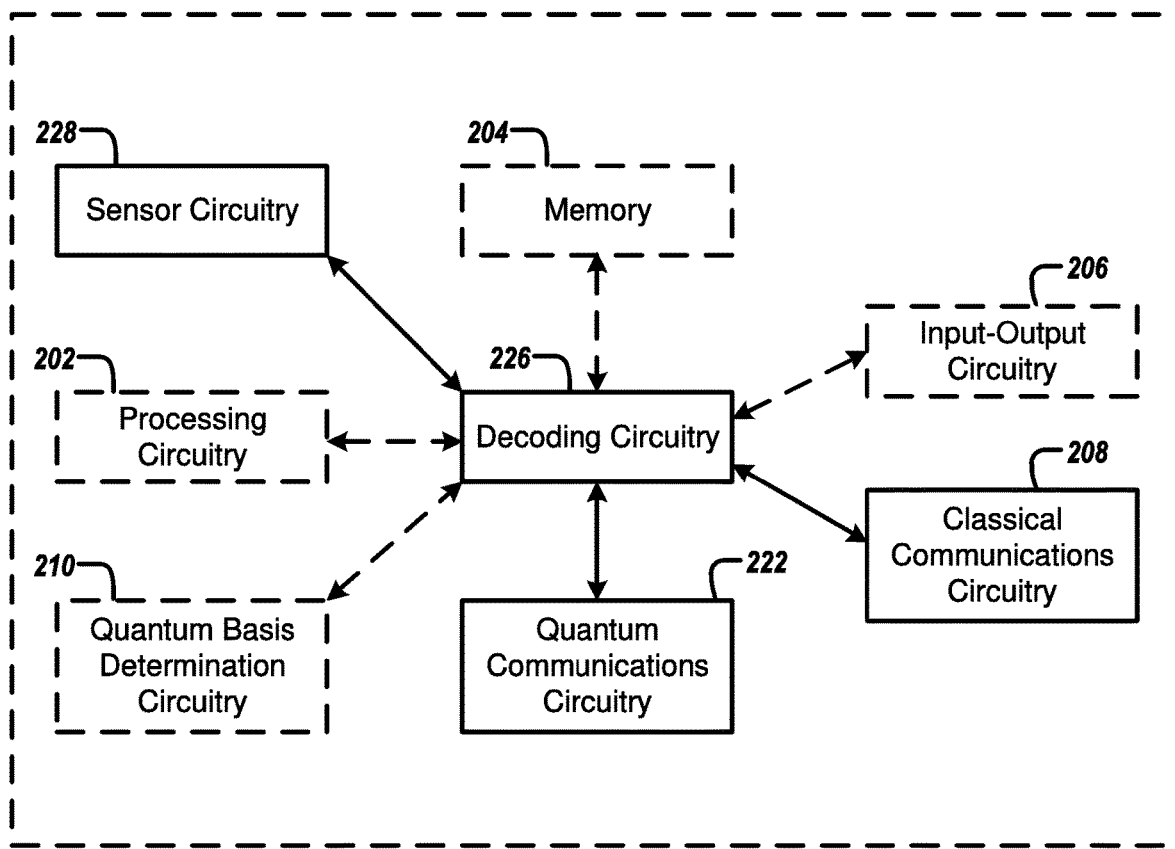

As illustrated in FIG. 2F, an apparatus 280 is shown that represents an example qubit decoder. The apparatus 280 includes classical communications circuitry 208 and quantum communications circuitry 222, as described above in connection with FIG. 2D, and additionally includes decoding circuitry 226 to decode a set of qubits received from a qubit encoder. Furthermore, in similar fashion as described above in connection with FIG. 2D, the apparatus 280 may further optionally include processing circuitry 202 and a memory 204 to facilitate operation of decoding circuitry 226, and may include quantum basis determination circuitry 210 in some embodiments where the quantum basis, or set of quantum bases, selected for decoding of a given set of bits is determined by the apparatus 280 and not by a separate session authentication system 102.

The decoding circuitry 226 includes hardware components designed or configured to generate a second set of bits by decoding the set of qubits received from a qubit encoder 114 based on a second set of quantum bases. The decoding circuitry 226 may comprise various optoelectronic components, such as those described previously. In some embodiments, the second set of quantum bases may be different from the first set of quantum bases used for encoding the set of qubits. For example, the decoding circuitry 226 may be configured to decode at least one qubit of the set of qubits using a quantum basis that is different from a quantum basis used to generate the at least one qubit. The second set of bits generated by the decoding circuitry 226 may be different from the first set of bits encoded by the qubit encoder 114. For example, the second set of bits may include one or more error bits that are not discarded. In some embodiments, when the encoding circuitry 224 of a qubit encoder 114 uses N quantum bases for encoding bits, the decoding circuitry 226 may use N−2, N−1, N+1, N+2, etc., quantum bases for decoding the qubits. In some embodiments, when the encoding circuitry 224 uses N quantum bases for encoding bits, the decoding circuitry 226 may also use N quantum bases for decoding the qubits, where the set of quantum bases used for encoding the bits is distinct from the set of quantum bases used for decoding the qubits. In some embodiments, when the encoding circuitry 224 uses N quantum bases for encoding bits, the decoding circuitry 226 may use the same N quantum bases for decoding the qubits, so long as the sequence by which the N quantum bases are selected for decoding qubits diverges from the sequence by which the N quantum bases are selected for encoding bits. For example, in some embodiments, the decoding circuitry 226 may include additional hardware components designed or configured to decode qubits based on a time-dependent quantum decoding schedule comprising a second plurality of quantum bases respectively corresponding to a second plurality of time periods. As another example, in some embodiments, the decoding circuitry 226 may include additional hardware components designed or configured to decode qubits based on a unit-dependent quantum decoding schedule comprising a second plurality of quantum bases respectively corresponding to a second plurality of numbers of bits to be decoded. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, quantum communications circuitry 222, or any suitable wired or wireless communications path to communicate with a server device (e.g., one or more session authentication system server devices 104) a qubit encoder 114, or any other suitable circuitry or device described herein. In some instances, the decoding circuitry 226 may decode the set of qubits by measuring the set of qubits using sensor circuitry 228.

The sensor circuitry 228 includes hardware components designed or configured to measure received qubits. For example, the sensor circuitry 228 may comprise one or more sensors such as photodetectors, photodiodes, cameras, or any other suitable devices or optoelectronic components. These hardware components may, for instance, utilize processing circuitry 202 to perform various computing operations and may utilize memory 204 for storage of data or electronic information received or generated by the sensor circuitry 228.

The apparatus 280 may be configured to execute various operations described above with respect to FIGS. 1A-1D and below with respect to FIGS. 3-8. It will be understood, however, that additional components providing additional functionality may be included in the apparatus 280 without departing from the scope of the present disclosure. Moreover, as noted previously, in some embodiments the qubit decoder 116 comprises a component of a session authentication system 102, and in such embodiments, the components described herein in connection with apparatus 280 shall be understood as comprising components of an apparatus 200 representing a corresponding session authentication system 102 (or a constituent session authentication system server device 104 thereof).

Although some of these components of apparatuses 200, 220, 240, 260, 270, and 280 are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, quantum communications interface, optoelectronic components, storage medium, or the like to perform their associated functions, such that duplicate hardware is not required for each set of circuitry. It should also be appreciated that, in some embodiments, one or more of these components may include a separate processor, specially configured field programmable gate array (FPGA), application specific interface circuit (ASIC), or cloud utility to perform its corresponding functions as described herein.

The use of the term "circuitry" as used herein with respect to components of apparatuses 200, 220, 240, 260, 270, and 280 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, quantum communications interfaces, input-output devices, optoelectronic components, and other components. In some embodiments, other elements of apparatuses 200, 220, 240, 260, 270, and 280 may provide or supplement the functionality of particular circuitry. For example, the processing circuitry 202 may provide processing functionality, memory 204 may provide storage functionality, and classical communications circuitry 208 may provide network interface functionality, among other features.

In some embodiments, various components of one or more of the apparatuses 200, 220, 240, 260, 270, or 280 may be hosted remotely (e.g., by one or more cloud servers) and thus need not physically reside on the corresponding apparatus 200, 220, 240, 260, 270, or 280. Thus, some or all of the functionality described herein may be provided by third party circuitry. For example, a given apparatus 200, 220, 240, 260, 270, or 280 may access one or more third party circuitries via any sort of networked connection that facilitates transmission of data and electronic information between the apparatus 200, 220, 240, 260, 270, or 280 and the third party circuitries. In turn, that apparatus 200, 220, 240, 260, 270, or 280 may be in remote communication with one or more of the other components describe above as comprising the apparatus 200, 220, 240, 260, 270, or 280.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 illustrates an example table 300 comprising example sets of bits and quantum bases. As shown in FIG. 3, example table 300 includes a qubit encoder (e.g., qubit encoder 114) that encodes a first set of bits ("11000110") based on a first set of quantum bases comprising a first quantum basis ("First," "First," "First," "First," "First," "First," "First," "First") to generate a set of qubits (e.g., an eight qubit sequence). The qubit encoder transmits the generated set of qubits over a quantum line (e.g., quantum line 118) to a qubit decoder (e.g., qubit decoder 116) or, in some instances, a switching device (e.g., switching device 122). The qubit decoder receives the set of qubits from the qubit encoder (or, in some instances, from the switching device) and measures the received set of qubits using a second set of quantum bases comprising alternative first and second quantum bases ("First," "Second," "First," "Second," "First," "Second," "First," "Second") to generate a decoded set of bits. When the qubit decoder measures a qubit using the first quantum basis, the decoded bit is correct. When the qubit decoder measures a qubit using the second quantum basis, the decoded bit is referred to herein as a "wildcard bit" that has a first probability (e.g., a fifty percent chance) of being correct and a second probability (e.g., a fifty percent chance) of being incorrect, because each state in the first quantum basis is a linear combination of the states in the second quantum basis. In the example illustrated in FIG. 3, the qubit decoder generates a decoded set of bits ("10000010") that includes four wildcard bits (e.g., the second bit "0"; the fourth bit "0"; the sixth bit "0"; and the eighth bit "0") and two error bits (e.g., the second bit "0" and the sixth bit "0").

It will be understood, however, that even if the qubit decoder were to store the received set of qubits and decode the received set of qubits a second time, the 50% probability of decoding accuracy when using the "wrong" quantum basis will ensure that a new decoded set of bits may not be the same as the original decoded set of bits. For instance, the new decoded set of bits generated by the qubit decoder may correctly decode the second bit, but may measure the sixth bit in error. Accordingly, even if a perpetrator were to deduce the original set of bits ("11000110"), there is no way for that perpetrator to deduce the decoded set of bits ("10000010") from the original set of bits. Thus, the session authentication system may use the decoded set of bits ("10000010") as a session ID or as the seed for a pseudo-random number generator that generates a session ID. Although an 8 qubit example is illustrated in FIG. 3, in some embodiments, a larger number of bits may be utilized (e.g., 256 bits, 1048 bits). Regardless of the number of bits used, a chance of error will remain for each bit measured using the incorrect quantum basis.

In some embodiments which are not shown in FIG. 3 for the sake of brevity, the qubit decoder may receive the set of qubits and measure the received qubits using alternative first, second, and third quantum bases ("First," "Second," "Third," "First," "Second," "Third," "First," "Second") to generate a decoded set of bits. In this situation, the decoded set of bits includes a higher likelihood of error because even fewer of the qubits will be decoded using the same quantum basis with which they were encoded. Accordingly, the amount of randomness introduced into the decoded set of bits may be increased by increasing the mismatch between the quantum bases used for encoding and decoding.

FIG. 4 illustrates an example table 400 comprising example sets of bits and quantum bases. As shown in FIG. 4, example table 400 includes a qubit encoder (e.g., qubit encoder 114) that encodes a set of bits ("11000110") based on a first set of quantum bases comprising a first quantum basis ("First," "First," "First," "First," "First," "First," "First," "First") to generate a set of qubits (e.g., an eight qubit sequence) comprising a first subset of qubits (e.g., the first four qubits of the eight qubit sequence) and a second subset of qubits (e.g., the last four qubits of the eight qubit sequence). The qubit encoder transmits, via a switching device (e.g., switching device 122), the generated first subset of qubits to a first qubit decoder (e.g., qubit decoder 116A) and the generated second subset of qubits to a second qubit decoder (e.g., qubit decoder 116B). The first qubit decoder receives the first subset of qubits and measures the received first subset of qubits using a second set of quantum bases comprising alternative first and second quantum bases ("First," "Second," "First," "Second") to generate a first decoded subset of bits. When the first qubit decoder measures a qubit using the first quantum basis, the decoded bit is correct. When the first qubit decoder measures a qubit using the second quantum basis, the decoded bit is a wildcard bit that has a first probability (e.g., a fifty percent chance) of being correct and a second probability (e.g., a fifty percent chance) of being incorrect, because each state in the first quantum basis is a linear combination of the states in the second quantum basis. In the example illustrated in FIG. 4, the first qubit decoder generates a first decoded set of bits ("1000") that includes two wildcard bits (e.g., the second bit "0" and the fourth bit "0") and one error bit (e.g., the second bit "0").

It will be understood, however, that even if the first subset of qubits were stored and decoded a second time, the 50% probability of decoding accuracy when using the "wrong" quantum basis will ensure that generating the first decoded set of bits a second time may not produce the same outcome as generating the first decoded set of bits the first time. For instance, the first qubit decoder may correctly decode the second bit, but may measure the fourth bit in error. Accordingly, even if a perpetrator were to deduce the first subset of bits ("1100"), there is no way for that perpetrator to deduce whether the first decoded set of bits in this example is correct ("1100") or contains error bits of in the second or the fourth bit. In other words, the first decoded set of bits could be "1100", "1101", "1000", or "1001," with equal probability. Thus, the first decoded set of bits may be used as a session ID or may be used as the seed for a pseudo-random number generator that generates a session ID.

A similar fact holds true regarding the second subset of qubits. In the example illustrated in FIG. 4, the second qubit decoder generates a second decoded set of bits ("0010") that includes two wildcard bits (e.g., the second bit "0" and the fourth bit "0") and one error bit (e.g., the second bit "0"). It will be understood, however, that even if the second subset of qubits were stored and decoded a second time, the 50% probability of decoding accuracy when using the "wrong" quantum basis will ensure that generating the second decoded set of bits a second time may not produce the same outcome as generating the second decoded set of bits the first time. For instance, the second qubit decoder may correctly decode the second bit, but may measure the fourth bit in error. Accordingly, even if a perpetrator were to deduce the second subset of bits ("0110"), there is no way for that perpetrator to deduce whether the second decoded set of bits in this example is correct ("0110") or contains error bits of in the second or the fourth bit. In other words, the second decoded set of bits could be "0110", "0111", "0010", or "0011," with equal probability. Thus, the second decoded set of bits may be used as a session ID or may be used as the seed for a pseudo-random number generator that generates a session ID. Although an 8 qubit example is illustrated in FIG. 4, in some embodiments, a larger number of bits may be utilized (e.g., 256 bits, 1048 bits). Regardless of the number of bits used, a chance of error will remain for each bit measured using the incorrect quantum basis.

In some embodiments which are not shown in FIG. 4 for the sake of brevity, each qubit decoder may receive a set of qubits and use alternative first, second, and third quantum bases ("First," "Second," "Third," "First," "Second," "Third," "First," "Second") to measure and thus decode the set of qubits. In this situation, the generated second set of bits includes a higher likelihood of error because even fewer of the qubits will be decoded using the same quantum basis with which they were encoded. Still other sets of quantum bases used for measuring received sets of qubits may be selected, as described previously. Accordingly, the amount of randomness introduced into the decoded set of bits may be increased by increasing the mismatch between the quantum bases used for encoding and decoding of qubits.

Having described specific components of example devices and circuitries involved in various embodiments contemplated herein, example procedures for session authentication are described below in connection with FIGS. 5-8.

Example Operations for Centralized Quantum Session Authentication

Turning to FIGS. 5-8, example flowcharts 500, 600, 700, and 800 are illustrated that contain example operations for centralized quantum session authentication according to example embodiments. The operations illustrated in FIGS. 5-8 may, for example, be performed by one or more of the apparatuses shown in FIGS. 1A-1D, and described in FIGS. 2A-2F, such as: apparatus 200, which illustrates an example session authentication system 102 or, in some instances, an example session authentication system server device 104; apparatus 220, which illustrates an example client device 110; apparatus 240, which illustrates an example central management device 112; apparatus 260, which illustrates an example qubit encoder 114; apparatus 270, which illustrates an example switching device 122; or apparatus 280, which illustrates an example qubit decoder 116. Although the following operations are described as being performed by one or another of apparatuses 200, 220, 240, 260, 270, or 280, it will be understood that this manner of description is for ease of explanation and should not be interpreted as meaning that others of apparatuses 200, 220, 240, 260, 270, or 280 cannot perform such operations (such as in embodiments in which, for instance, one or more of these apparatuses comprise components of another of these apparatuses). The various operations described in connection with FIGS. 5-8 may be performed by one of apparatuses 200, 220, 240, 260, 270, or 280, and by or through the use of one or more corresponding processing circuitry 202, memory 204, input-output circuitry 206, classical communications circuitry 208, quantum basis determination circuitry 210, RNG circuitry 212, PRNG circuitry 214, session authentication circuitry 216, QKD circuitry 218, quantum communications circuitry 222, encoding circuitry 224, decoding circuitry 226, sensor circuitry 228, switching circuitry 230, any other suitable circuitry, or any combination thereof.

Figure 5:
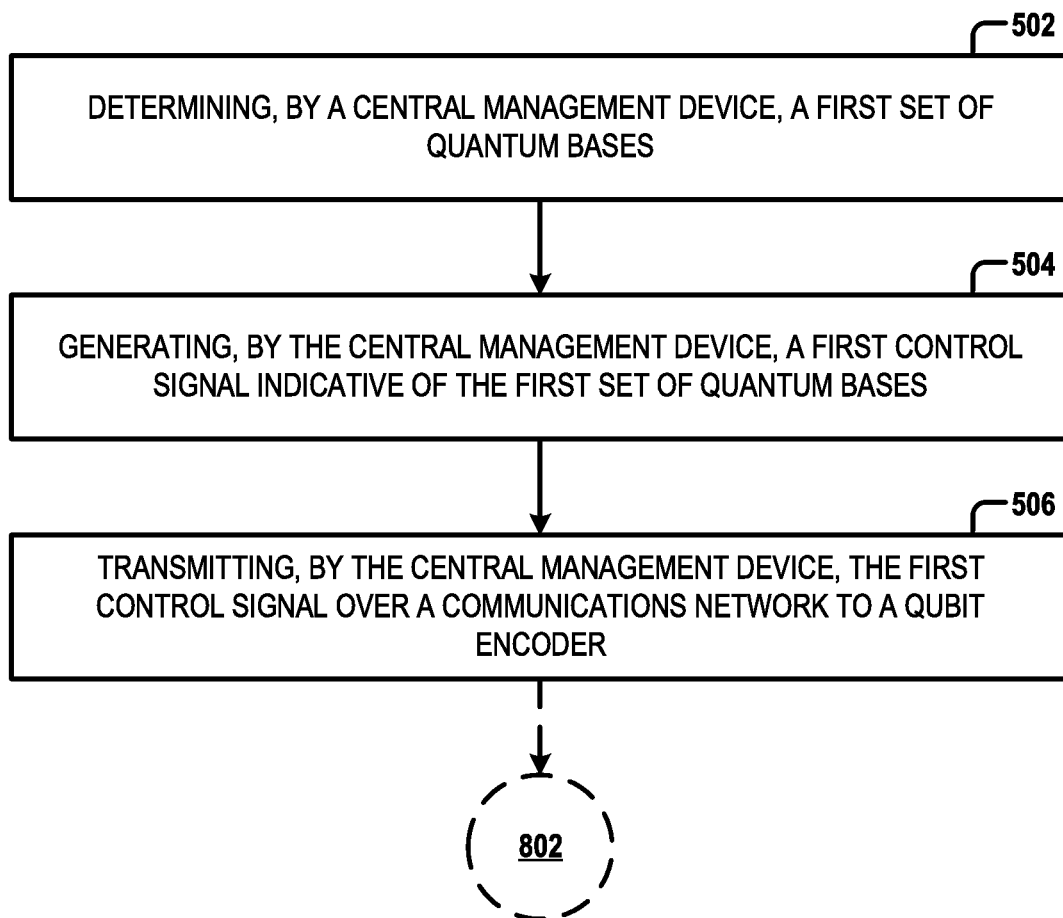
FIG. 5 illustrates an example flowchart for centralized quantum session authentication in accordance with some example embodiments described herein.

Turning next to FIG. 5, an example flowchart 500 is shown for centralized quantum session authentication that comprises determining a first set of quantum bases, generating a first control signal indicative of the first set of quantum bases, and transmitting the first control signal over a communications network to a qubit encoder.

As shown by operation 502, an apparatus (e.g., apparatus 200, apparatus 240) comprising a central management device 112 includes means for determining a first set of quantum bases. The means for determining the first set of quantum bases may be any suitable means, such as quantum basis determination circuitry 210.

As shown by operation 504, the apparatus (e.g., apparatus 200, apparatus 240) comprising the central management device 112 includes means for generating a first control signal indicative of the first set of quantum bases. The means for generating the first control signal may be any suitable means, such as quantum basis determination circuitry 210.

As shown by operation 506, the apparatus (e.g., apparatus 200, apparatus 240) comprising the central management device 112 includes means for transmitting the first control signal over a communications network (e.g., one or more communications networks 108, a non-network communications path) to a qubit encoder (e.g., qubit encoder 114). The means for transmitting the first control signal may be any suitable means, such as classical communications circuitry 208. From operation 506, the procedure may advance to operation 802, described below in connection with FIG. 8.

Figure 6:
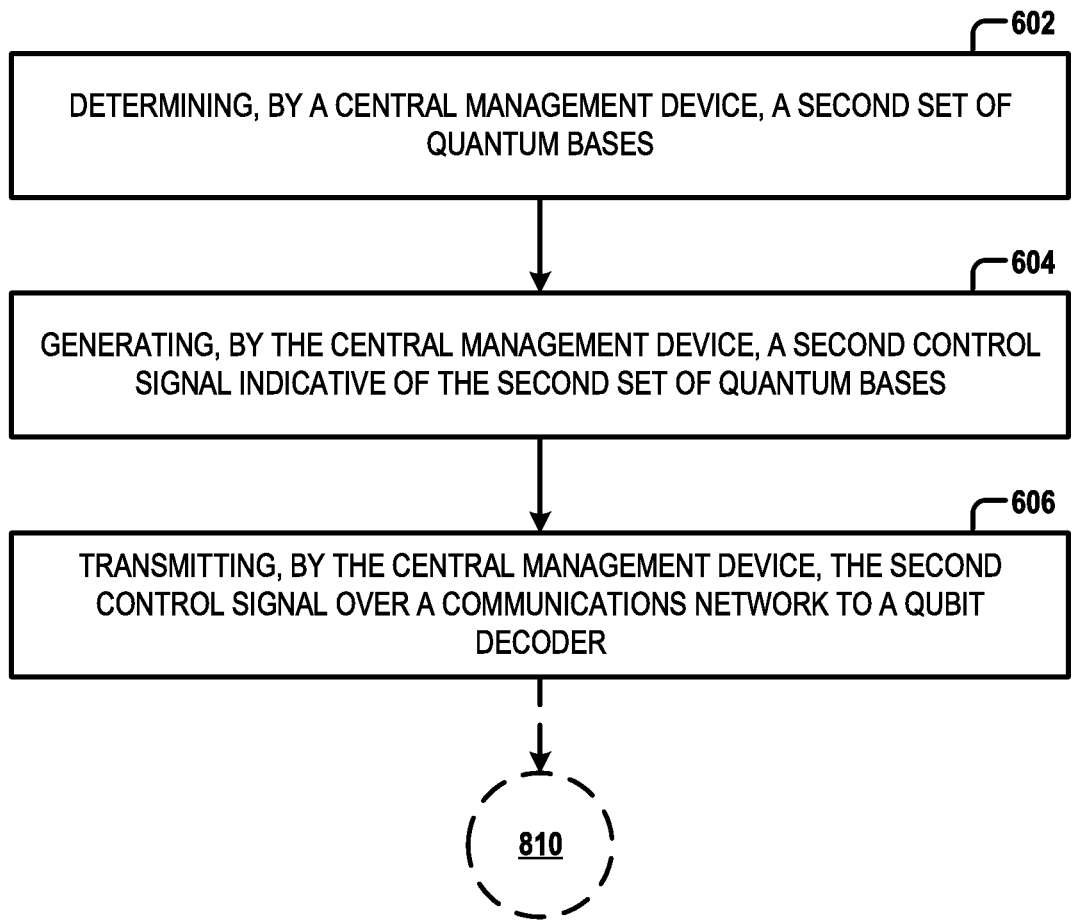
FIG. 6 illustrates an example flowchart for centralized quantum session authentication in accordance with some example embodiments described herein.

Turning next to FIG. 6, an example flowchart 500 is shown for centralized quantum session authentication that comprises determining a second set of quantum bases, generating a second control signal indicative of the second set of quantum bases, and transmitting the second control signal over a communications network to a qubit decoder.

As shown by operation 602, an apparatus (e.g., apparatus 200, apparatus 240) comprising a central management device 112 includes means for determining a second set of quantum bases. The means for determining the second set of quantum bases may be any suitable means, such as quantum basis determination circuitry 210.

As shown by operation 604, the apparatus (e.g., apparatus 200, apparatus 240) comprising the central management device 112 includes means for generating a second control signal indicative of the second set of quantum bases. The means for generating the second control signal may be any suitable means, such as quantum basis determination circuitry 210.

As shown by operation 606, the apparatus (e.g., apparatus 200, apparatus 240) comprising the central management device 112 includes means for transmitting the second control signal over a communications network (e.g., one or more communications networks 108, a non-network communications path) to a qubit decoder (e.g., qubit decoder 116). The means for transmitting the second control signal may be any suitable means, such as classical communications circuitry 208. From operation 606, the procedure may advance to operation 810, described below in connection with FIG. 8.

Figure 7:
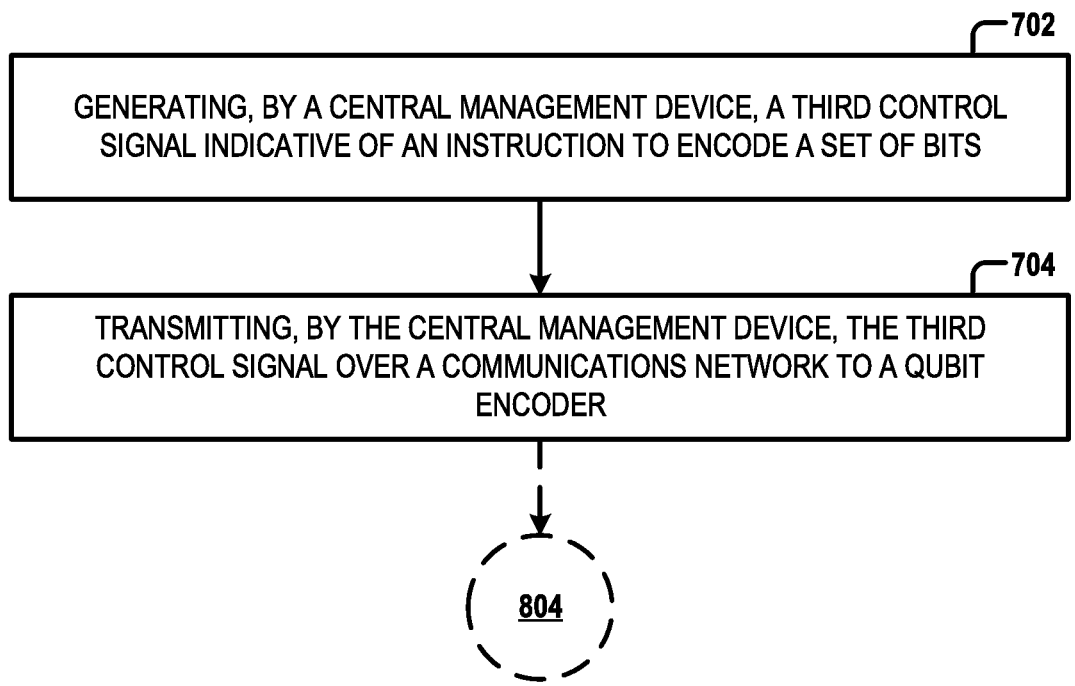
FIG. 7 illustrates an example flowchart for centralized quantum session authentication in accordance with some example embodiments described herein.

Turning next to FIG. 7, an example flowchart 500 is shown for centralized quantum session authentication that comprises generating a third control signal indicative of an instruction to encode a set of bits and transmitting the third control signal over a communications network to the qubit encoder.

As shown by operation 702, an apparatus (e.g., apparatus 200, apparatus 240) comprising a central management device 112 includes means for generating a third control signal indicative of an instruction to encode a set of bits. The means for generating the third control signal may be any suitable means, such as quantum basis determination circuitry 210.

As shown by operation 504, the apparatus (e.g., apparatus 200, apparatus 240) comprising the central management device 112 includes means for transmitting the third control signal over a communications network (e.g., one or more communications networks 108, a non-network communications path) to a qubit encoder (e.g., qubit encoder 114). The means for transmitting the third control signal may be any suitable means, such as classical communications circuitry 208. From operation 704, the procedure may advance to operation 804, described below in connection with FIG. 8.

Figure 8:
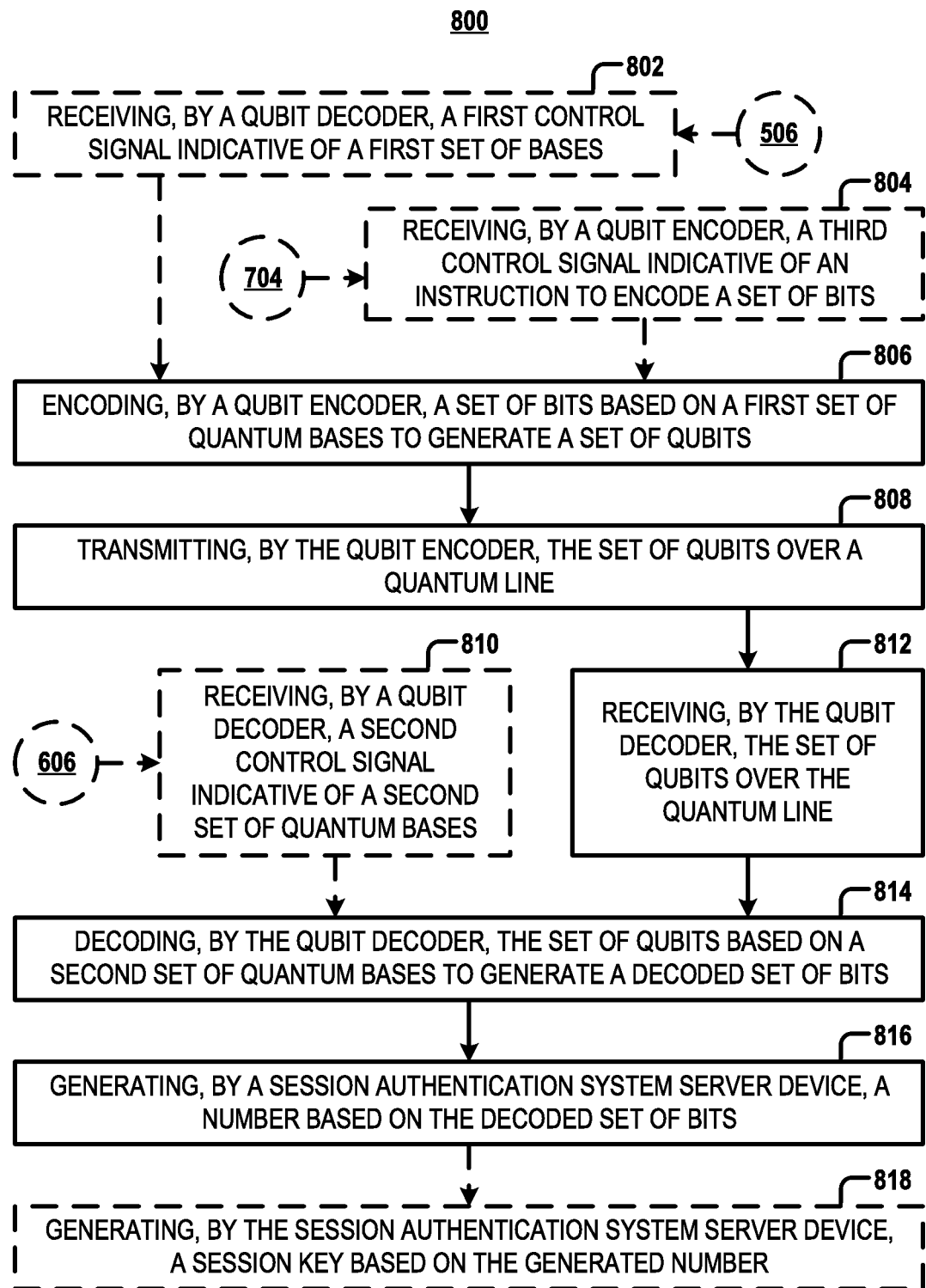
FIG. 8 illustrates an example flowchart for centralized quantum session authentication in accordance with some example embodiments described herein.

Turning next to FIG. 8, an example flowchart 800 is shown for centralized quantum session authentication. In some instances, the example flowchart 800 provides for centralized quantum session authentication based at least partially on: the first control signal transmitted in operation 506 as described above in connection with FIG. 5; the second control signal transmitted in operation 606 as described above in connection with FIG. 6; the third control signal transmitted in operation 704 as described above in connection with FIG. 7; or a combination thereof.

As shown by operation 802, a first apparatus (e.g., apparatus 260) comprising a qubit encoder 114 includes means for receiving the first control signal transmitted in operation 506 as described above in connection with FIG. 5. The means for receiving the first control signal may be any suitable means, such as classical communications circuitry 208.

As shown by operation 804, the first apparatus (e.g., apparatus 260) comprising the qubit encoder 114 includes means for receiving the third control signal transmitted in operation 704 as described above in connection with FIG. 7. The means for receiving the third control signal may be any suitable means, such as classical communications circuitry 208.

As shown by operation 806, a first apparatus (e.g., apparatus 260) comprising a qubit encoder 114 includes means for encoding a set of bits based on a first set of quantum bases to generate a set of qubits. The means for generating the set of qubits may be any suitable means, such as encoding circuitry 224 of a qubit encoder 114, as described with reference to FIGS. 1A-1D and FIG. 2D. The qubit encoder may be any suitable optoelectronic device, such as those described previously. As shown in FIG. 3, the set of bits ("11000110") may be encoded based on a first quantum basis ("First," "First," "First," "First," "First," "First," "First," "First") to generate a set of qubits (e.g., an eight qubit sequence). It will be understood that although a qubit encoder 114 encodes a set of bits based on the first set of quantum bases, other devices illustrated in the environments of FIGS. 1A-1D may perform preliminary operations facilitating performance of operation 806. In some embodiments, the encoding circuitry 224 may be configured to receive or retrieve the first set of quantum bases based on the first control signal received at operation 802. In some embodiments, the encoding circuitry 224 may be configured to encode, in response to receipt of the third control signal at operation 804, the set of bits based on the first set of quantum bases to generate a set of qubits. In some embodiments, either the qubit encoder 114 itself, the central management device 112, or a session authentication system 102 (in embodiments where the central management device 112 is a component thereof) may invoke quantum basis determination circuitry 210 to select the first set of quantum bases. As noted previously, the quantum basis determination circuitry 210 may utilize a pseudo-random quantum basis selection technique for identifying one or more quantum bases to utilize in the first set of quantum bases. Moreover, this pseudo-random quantum basis selection technique may identify not just a set of quantum bases to use, but may also identify one or another encoding schedule (e.g., a time-dependent quantum encoding schedule or a unit-dependent quantum encoding schedule, or another quantum encoding schedule altogether) governing when to use each quantum basis in the set of quantum bases for encoding of the set of bits.

As shown by operation 808, the first apparatus (e.g., apparatus 260) comprising the qubit encoder 114 includes means for transmitting the set of qubits over a quantum line (e.g., quantum line 118, quantum line 124) to a qubit decoder 116 or, in some instances, to a switching device 122. The means for transmitting the set of qubits may be any suitable means, such as quantum communications circuitry 222 described with reference to FIG. 2D. The quantum line may be any suitable quantum line, such as quantum line 118 described with reference to FIGS. 1A-1D. The qubit decoder 116 may be any suitable optoelectronic device, such as qubit decoder 116 described with reference to FIGS. 1A-1D.

As shown by operation 810, a second apparatus (e.g., apparatus 280) comprising a qubit decoder 116 includes means for receiving the second control signal transmitted in operation 606 as described above in connection with FIG. 5. The means for receiving the second control signal may be any suitable means, such as classical communications circuitry 208.

As shown by operation 812, the second apparatus (e.g., apparatus 280) comprising the qubit decoder 116 includes means for receiving the set of qubits over the quantum line (e.g., quantum line 118, quantum line 124) from the qubit encoder 114 or, in some instances, from the switching device 122. The means for receiving the set of qubits may be any suitable means, such as quantum communications circuitry 222.

As shown by operation 814, the second apparatus (e.g., apparatus 280) comprising the qubit decoder 116 includes means for decoding the set of qubits based on a second set of quantum bases to generate a decoded set of bits. In some embodiments, this second set of quantum bases is different from the first set of quantum bases. In other embodiments, the second set of quantum bases is not different from the first set of quantum bases, but the schedule governing which quantum basis is selected for decoding of which qubit is different than the schedule governing which quantum basis was selected for encoding of which of the original set of bits. The means for generating the decoded set of bits may be any suitable means, such as decoding circuitry 226 of apparatus 280, described with reference to FIG. 2F. In some embodiments, the decoding circuitry 226 may be configured to receive or retrieve the second set of quantum bases based on the second control signal received at operation 810. The decoded set of bits thus have a probability of being different from the set of bits encoded at operation 806. For example, as shown in the example provided in FIG. 3, the set of qubits may be decoded by the apparatus 280 based on alternative first and second quantum bases ("First," "Second," "First," "Second," "First," "Second," "First," "Second") to generate a set of bits ("10000010"). When compared to the initial set of bits ("11000110"), the set of bits ("10000010") includes four wildcard bits (e.g., the second bit "0"; the fourth bit "0"; the sixth bit "0"; and the eighth bit "0") and two error bits (e.g., the second bit "0" and the sixth bit "0").

As shown by operation 816, a third apparatus (e.g., apparatus 200) comprising a session authentication system server device 104 thereafter includes means for generating a number based on the decoded set of bits. The means for generating the number may be any suitable means, such as RNG circuitry 212 described with reference to FIG. 2A. For example, the generated number may be the decoded set of bits ("10000010"). In another example, the generated number may be a number that includes the decoded set of bits in its entirety (e.g., "1000001000000000"). It will be understood that in embodiments where the apparatus 200 comprises a distinct apparatus from apparatus 280, an intervening operation may take place in which the apparatus 280 comprises means, such as classical communications circuitry 208, for transmitting the decoded set of bits to the apparatus 200 (and the apparatus 200 includes corresponding classical communications circuitry 208 for receiving the decoded set of bits).

Optionally, as shown by optional operation 818, the third apparatus (e.g., apparatus 200) comprising a session authentication system server device 104 includes means for generating a session key based on the generated number. The means for generating the session key may be any suitable means, such as RNG circuitry 212, PRNG circuitry 214, session authentication circuitry 216, QKD circuitry 218, or a combination thereof. For example, the PRNG circuitry 214 may be configured to use the generated number as a seed for pseudo-random number generation, and to generate a pseudo-random number based on the seed, and then to transmit the pseudo-random number to the session authentication circuitry 216. The session authentication circuitry 216 may receive the pseudo-random number and generate the session key based on the pseudo-random number. In some instances, session authentication circuitry 216 may receive a number directly from RNG circuitry 212 and may generate the session key based directly on the generated number. In this regard, in some embodiments, the generated number may be the session key. In other instances, the pseudo-random number may be the session key. In still other instances, the session authentication circuitry 216 may perform a transformation on the pseudo-random number (e.g., convolution with another variable, such as time) to arrive at the session key. In some instances, the decoded set of bits may comprise at least one error bit, and the session authentication circuitry 216 may generate the session key based at least in part on the at least one error bit. In some instances, the decoded set of bits may comprise at least one wildcard bit (e.g., a decoded bit having a probability of being an error bit as a result of quantum uncertainty), and the session authentication circuitry 216 may generate the session key based at least in part on the at least one wildcard bit. In some embodiments, the session authentication circuitry 216 may then transmit the generated session key to a client device 110 (e.g., via invoking QKD circuitry 218 to effect secure transmission of the session key), and may thereafter use the generated session key to authenticate a session between two devices, such as between the client device 110 and another device (e.g., a session authentication system server device 104 hosting a session accessed by the client device 110). Operation 818 is illustrated as optional insofar as the number generated in operation 816 may be used in theory for a variety of purposes, and not just within the context of session key generation.

It will be understood that although operations 816 and 818 are described above to illustrate practical applications of some example embodiments described herein, the number generated in operation 816 may in other embodiments be used for a variety of additional or alternative purposes (e.g., for gaming devices, statistics, cryptography, or the like) that may not necessarily fall within the context of session authentication.

In some embodiments, operations 502, 504, 506, 602, 604, 606, 702, 704, 802, 804, 806, 808, 810, 812, 814, 816, and 818 may not necessarily occur in the order depicted in FIGS. 5-8, and in some cases one or more of the operations depicted in FIGS. 5-8 may occur substantially simultaneously, or additional steps may be involved before, after, or between any of the operations shown in FIGS. 5-8.

As noted previously, there are many advantages of these and other embodiments described herein. In all cases, however, example embodiments of the present disclosure enhance the session authentication procedure by providing a session key that has truly random elements, which facilitate the generation of a session ID that cannot be reproduced by a third party.

FIGS. 5-8 thus illustrate example flowcharts describing the operation of various systems (e.g., session authentication system 102 described with reference to FIGS. 1A-1D), apparatuses (e.g., the apparatuses 200, 220, 240, 260, 270, and 280 described with reference to FIGS. 2A-2F), methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200, 220, 240, 260, 270, or 280) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 5-8 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for session authentication, the system comprising:
a central management device comprising:
quantum basis determination circuitry;
classical communications circuitry;
a qubit decoder; and
a session authentication circuitry,
wherein the quantum basis determination circuitry is configured to:
determine a first set of quantum bases,
determine a second set of quantum bases,
generate a first control signal indicative of the first set of quantum bases,
generate a second control signal indicative of the second set of quantum bases, and
generate a third control signal indicative of an instruction to encode a set of bits; and
wherein the classical communications circuitry is configured to:
transmit the first control signal over a communications network to a qubit encoder,
transmit the second control signal over the communications network to the qubit decoder, and
transmit the third control signal over the communications network to the qubit encoder;
wherein the qubit decoder comprises decoding circuitry configured to decode the set of qubits based on the second set of quantum bases to generate a decoded set of bits; and
wherein the session authentication circuitry configured to generate a session key based on the decoded set of bits.

2. The system of claim 1,
wherein the classical communications circuitry is configured to receive, over the communications network from the qubit decoder, electronic information indicative of the second set of quantum bases; and
wherein the quantum basis determination circuitry is configured to determine the first set of quantum bases based on the electronic information indicative of the second set of quantum bases, wherein the first set of quantum bases and the second set of quantum bases are different.

3. The system of claim 1,
wherein the classical communications circuitry is configured to receive, over the communications network from the qubit encoder, electronic information indicative of the first set of quantum bases; and
wherein the quantum basis determination circuitry is configured to determine the second set of quantum bases based on the electronic information indicative of the first set of quantum bases, wherein the second set of quantum bases and the first set of quantum bases are different.

4. The system of claim 1, wherein the quantum basis determination circuitry is configured to generate a time-dependent quantum encoding schedule comprising a first plurality of quantum bases respectively corresponding to a first plurality of time periods, wherein the first control signal comprises the time-dependent quantum encoding schedule, and wherein the first set of quantum bases comprises the first plurality of quantum bases.

5. The system of claim 4, wherein the quantum basis determination circuitry is configured to generate a time-dependent quantum decoding schedule comprising a second plurality of quantum bases respectively corresponding to a second plurality of time periods, wherein the second control signal comprises the time-dependent quantum decoding schedule, and wherein the second set of quantum bases comprises the second plurality of quantum bases.

6. The system of claim 1, wherein the quantum basis determination circuitry is configured to generate a unit-dependent quantum encoding schedule comprising a first plurality of quantum bases respectively corresponding to a first plurality of numbers of bits, wherein the first control signal comprises the unit-dependent quantum encoding schedule, and wherein the first set of quantum bases comprises the first plurality of quantum bases.

7. The system of claim 6, wherein the quantum basis determination circuitry is configured to generate a unit-dependent quantum decoding schedule comprising a second plurality of quantum bases respectively corresponding to a second plurality of numbers of bits, wherein the second control signal comprises the unit-dependent quantum decoding schedule, and wherein the second set of quantum bases comprises the second plurality of quantum bases.

8. The system of claim 1, wherein the quantum basis determination circuitry is configured to determine the first set of quantum bases using a pseudo-random quantum basis selection technique.

9. The system of claim 8, wherein the quantum basis determination circuitry is configured to determine the second set of quantum bases using the pseudo-random quantum basis selection technique.

10. The system of claim 8, wherein the pseudo-random quantum basis selection technique comprises a frequency calculation procedure.

11. The system of claim 1, wherein the classical communications circuitry is first classical communications circuitry, wherein system further comprises the qubit encoder, and wherein the qubit encoder comprises:
second classical communications circuitry in communication with the first classical communications circuitry and configured to
receive, over the communications network, the first control signal, and
receive, over the communications network, the third control signal;
encoding circuitry configured to encode, in response to receipt of the third control signal, the set of bits based on the first set of quantum bases to generate a set of qubits; and
quantum communications circuitry configured to transmit the set of qubits over a quantum line.

12. The system of claim 11, wherein the encoding circuitry is configured to not transmit electronic information indicative of the first set of quantum bases.

13. The system of claim 11, wherein the quantum communications circuitry is first quantum communications circuitry, and wherein the qubit decoder comprises:
second quantum communications circuitry configured to receive, over the quantum line, the set of qubits; and
third classical communications circuitry in communication with the first classical communications circuitry and configured to receive, over the communications network, the second control signal.

14. The system of claim 13, wherein the decoding circuitry is configured to not transmit electronic information indicative of the second set of quantum bases.

15. The system of claim 13, wherein the first quantum communications circuitry is configured to transmit the set of qubits over a first quantum line, wherein the second quantum communications circuitry configured to receive the set of qubits over a second quantum line, and wherein system further comprises switching circuitry configured to:
receive the set of qubits over the first quantum line, and transmit the set of qubits over the second quantum line.

16. The system of claim 13, wherein the third classical communications circuitry is configured to transmit the decoded set of bits over the communications network to a session authentication system server device, and wherein the session authentication system server device comprises:
fourth classical communications circuitry in communication with the third classical communications circuitry and configured to receive, over the communications network, the decoded set of bits.

17. The system of claim 16, wherein the fourth classical communications circuitry is configured to transmit the session key to a client device for use in session authentication by causing quantum key distribution circuitry to perform a quantum key distribution process that transmits the generated session key to the client device.

18. The system of claim 16, wherein the session authentication system server device further comprises random number generation circuitry in communication with the session authentication circuitry and configured to generate a number based on the decoded set of bits, and wherein the session authentication circuitry is configured to generate the session key by (i) setting the session key equal to the generated number, or (ii) using the generated number as a seed in a pseudo-random number generation procedure, wherein an output of the pseudo-random number generation procedure comprises the session key.

19. A method for session authentication, the method comprising:
determining, by quantum basis determination circuitry, a first set of quantum bases;
determining, by the quantum basis determination circuitry, a second set of quantum bases;
generating, by the quantum basis determination circuitry, a first control signal indicative of the first set of quantum bases;
generating, by the quantum basis determination circuitry, a second control signal indicative of the second set of quantum bases;
generating, by the quantum basis determination circuitry, a third control signal indicative of an instruction to encode a set of bits;
transmitting, by classical communications circuitry, the first control signal over a communications network to a qubit encoder;
transmitting, by the classical communications circuitry, the second control signal over the communications network to a qubit decoder;
transmitting, by classical communications circuitry, the control signal over the communications network to the qubit encoder;
decoding, by the qubit decoder, the set of qubits based on the second set of quantum bases to generate a decoded set of bits; and
generating, by session authentication circuitry, a session key based on the decoded set of bits.

20. A computer program product for session authentication, the computer program product comprising at least one non-transitory computer-readable storage medium storing program instructions that, when executed, cause a central management device to:
determine a first set of quantum bases;
determine a second set of quantum bases;
generate a first control signal indicative of the first set of quantum bases;
generate a second control signal indicative of the second set of quantum bases;
generate a third control signal indicative of an instruction to encode a set of bits;
transmit the first control signal over a communications network to a qubit encoder;
transmit the second control signal over the communications network to a qubit decoder;
transmit the third control signal over the communications network to the qubit encoder;
decode, by the qubit decoder, the set of qubits based on the second set of quantum bases to generate a decoded set of bits; and
generate, by session authentication circuitry, a session key based on the decoded set of bits.

* * * * *